United States Patent [19]
Kramer

[11] Patent Number: 6,087,627
[45] Date of Patent: Jul. 11, 2000

[54] METHOD OF CONTROLLING A WELDING PROCESS AND CONTROLLER THEREFOR

[75] Inventor: Arthur Kramer, Solon, Ohio

[73] Assignee: Lincoln Global, Inc., Cleveland, Ohio

[21] Appl. No.: 09/157,671

[22] Filed: Sep. 21, 1998

[51] Int. Cl.[7] .................................................. B23K 9/095
[52] U.S. Cl. ............................... 219/130.21; 219/130.31; 219/137 PS
[58] Field of Search ................. 219/130.21, 130.51, 219/130.31, 130.32, 130.33, 137 PS

[56] References Cited

U.S. PATENT DOCUMENTS

| | | | |
|---|---|---|---|
| 3,632,960 | 1/1972 | Erdmann-Jesnitzer et al. ... | 219/130.32 |
| 4,647,754 | 3/1987 | Hirasawa .......................... | 219/130.21 |
| 5,221,825 | 6/1993 | Siewert et al. .................... | 219/130.21 |
| 5,270,516 | 12/1993 | Hamamoto et al. ............... | 219/130.21 |
| 5,369,243 | 11/1994 | Kramer et al. . | |
| 5,756,967 | 5/1998 | Quinn et al. ....................... | 219/130.21 |

OTHER PUBLICATIONS

"An Evaluation of Short Circuiting Arc Phenomena in GMA Welding", *Welding & Metal Fabrication*, p. 15, Dec. 1989.
"GMAW Electrical Measurements and Their Interpretation in Terms of Simulated Welding Behavior"; date unknown.

*Primary Examiner*—Clifford C. Shaw
*Attorney, Agent, or Firm*—Vickers, Daniels & Young

[57] ABSTRACT

A controller and method for adjusting an output welding parameter of a D.C. electric arc welder for controlling a welding process wherein a welding wire is advanced toward a workpiece while an arc voltage is applied across the advancing wire and the workpiece, the control and method comprise measuring the rate of spatter events and then adjusting the output parameter to maintain the measured rate of spatter events at a selected rate in the range of 10–30 spatter events per second.

34 Claims, 21 Drawing Sheets

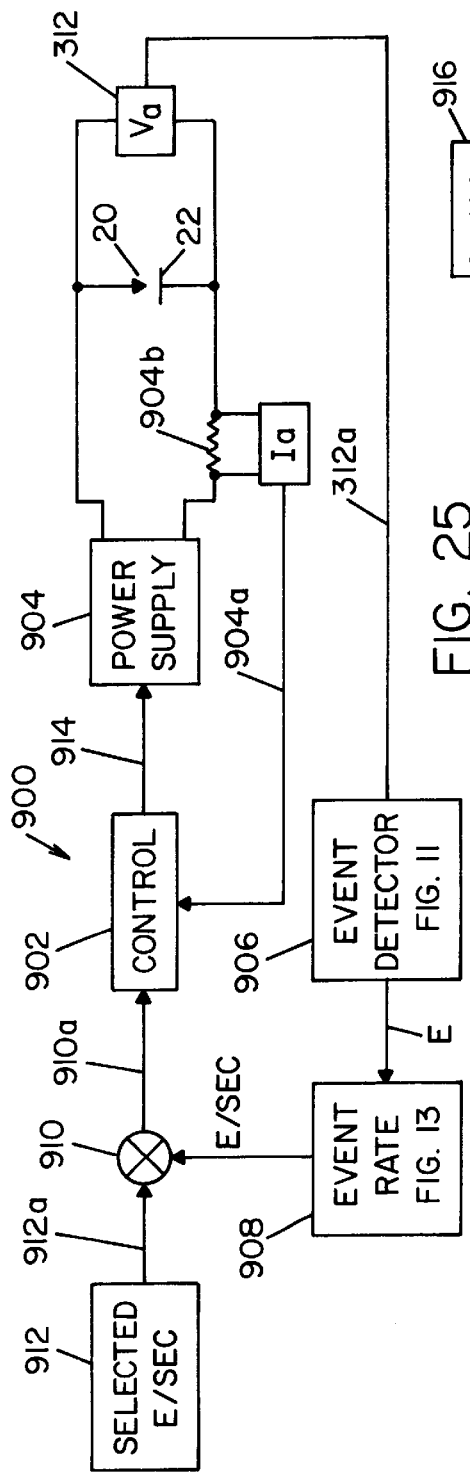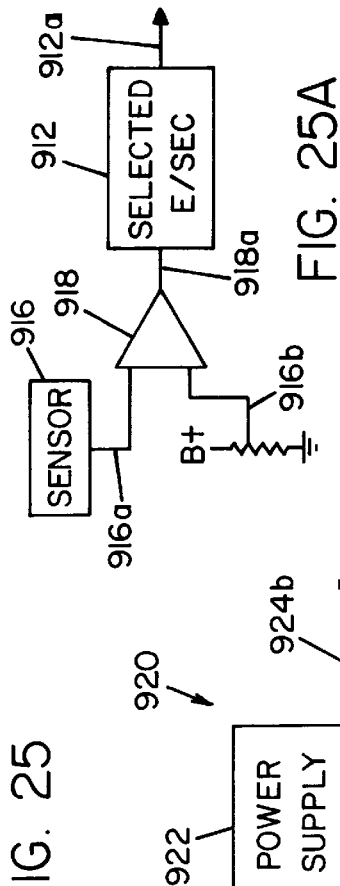
FIG. 25
FIG. 25A
FIG. 26

METHOD OF CONTROLLING A WELDING PROCESS AND CONTROLLER THEREFOR

The invention relates to the field of electric arc welding wherein a welding wire is advanced toward a workpiece while a D.C. arc voltage is applied across the advancing wire and the workpiece for the purpose of melting the wire and depositing the molten metal onto the workpiece and more particularly to a method of controlling the welding process and a controller for practicing the method.

INCORPORATION BY REFERENCE

To determine the consistency of a welding wire to be used in automatic arc welding, a spatter voltage parameter has been measured for the particular wire. If testing of the spatter voltage of a wire shows a voltage within a selected range, the quality and consistency of the wire is assured. The wire evaluation procedure is taught in Kramer U.S. Pat. No. 5,369,243 disclosing certain concepts employed in the present invention. This prior patent is incorporated by reference herein to teach certain concepts applicable to the present invention; however, the prior patent relates to testing a particular characteristic of the wire for use as a measure of its quality. Consequently, Kramer 5,369,243 constitutes background information and technical information which need not be repeated in explaining the present invention.

In an article entitled "An Evaluation of Short Circuiting Arc Phenomena in GMA Welding" at page 15 of *Welding & Metal Fabrication* (December, 1989), a computer is used to reveal the arc voltage in a short circuit mode of operation. The concept of instantaneous shorts is explained. The current and voltage are both analyzed to give a factor relating to arcing time which is combined with the ratio of instantaneous shorts to actual shorts. This comparison is used to analyze a welding operation on a theoretical basis. Since the article does show a computer looking at digitized welding voltage and discusses incipient shorts, it is incorporated by reference herein as general background information. Another paper is incorporated by reference as background information. "GMAW Electrical Measurements and Their Interpretation in Terms of Simulated Welding Behavior" (date unknown) shows current and voltage traces during short circuit transfer and discusses spray and globular transfer as shown in FIGS. 1 and 2. This paper analyzes an existing process for simulation by using random noise.

BACKGROUND OF INVENTION

Electric arc welding is a complicated process and the resulting deposition of molten metal into a weld pool for performing the welding operation is determined by a tremendous number of interrelated and non-interrelated parameters. These parameters affect the deposition rate, the spatter and debris around the welding operation, the shape and appearance of the weld bead, and the location and quality of the protective slag, to name just a few. The welding process is controlled by the protective gas composition, its flow rate, torch design, the welding torch angle, welding tip design, the size and shape of the deposition groove, control apparatus used in the welding process, amount of stick-out, wire feed speed, speed of the torch along the workpiece, smoke extraction, type of grounding contact on the workpiece, atmospheric conditions, the composition of the workpiece and other variables. Consequently, arc welding has been largely a trial and error procedure with the ability of the welder to use the appropriate settings for obtaining consistent welds. Each time one of the parameters is changed, the appearance, size, shape, contour, chemistry and mechanical properties of the resulting weld is affected. For this reason, arc welding is not a precise science, but rather an art form requiring trained welding engineers to provide the desired results. Most systems employ electrical welding parameters at the welder itself, such as a closed loop control based upon arc voltage, arc current or pulse settings. The settings of voltage, current or pulse size or rate are controlled by the welding engineer or by the technician for generating the desired welding. There is no procedure in the art which controls a D.C. welding process ad hoc without the intervention of the welder or welding engineer. Consequently, in high production D.C. welding the weld is controlled by adjusting various primary parameters and disregarding the less meaningful parameters.

In summary, automatic arc welding using a D.C. arc welding process is normally controlled by the welder in a manner that will not accomplish uniform welding results with variations in one or all of the many welding parameters or variables.

In a D.C. arc welding process of a voltage control mode, to which the present invention is particularly directed, it is known that semi-automatic and automatic welding can be controlled at a constant arc voltage. If this voltage is relatively high as shown by the voltage trace in FIG. 1, a relatively constant arc voltage can be maintained with very little deviation from the norm and without apparent or significant voltage deflections. When operating at this high voltage, the metal transferred in the plasma arc welding process is by spray transfer wherein very small, liquid metal streams from the wire to the workpiece in the arc itself. The weld puddle is observed to be relatively quiet. This makes high voltage D.C. arc welding at a constant voltage quite inviting. However, the high voltage of the plasma arc welding as shown in FIG. 1 generates excessive heat and electromagnetic radiation. Additionally, it evaporates the iron of the workpiece as well as the iron of the electrode or advancing wire. This iron vapor is oxidized in the high temperature of the arc to an iron oxide aerosol which condenses on the relatively cool workpiece surface primarily as iron oxide dust. This produces a somewhat "dirty" welding process and is not considered to be optimum for the D.C. welding procedure. If the constant voltage setting for the arc welder is reduced substantially from the set voltage in FIG. 1 to the constant voltage illustrated in the voltage trace of FIG. 2, a globular or short circuit D.C. welding process is performed. This constant voltage process is characterized by a large number (over about 80 per second) of significant negative voltage deviations. Indeed, when short circuits occur, the arc voltage plunges to a voltage near zero, i.e. 7–10 volts, and may stay there for a long time, i.e. until the short is broken. As a result the wire advancing toward the workpiece is driven into the weld puddle to form a short circuit. When this happens, the arc is extinguished and the wire heats up and explodes. The explosion breaks electric contact and the voltage immediately shifts to the high set voltage, which is normally overshot due to the inductance of the welding power supply. When the short is broken and the voltage shifts back toward the set arc voltage, the wire is still rapidly moving toward the workpiece. Thus, the arc is reestablished and this cycle is repeated. Consequently, great voltage instability occurs immediately after the short and the break referred to as a "neck" before the electric arc or plasma is again established. This mode of metal transfer is primarily "globular" in nature with a great number of negative dips, but is also a "short circuit mode" with over 100 shorts per second. These processes create chaotic action in the molten metal forming the weld puddle. When actually in the short circuit mode of operation, the wire or electrode shifts up and down so that the molten metal on the end of the advancing wire causes a short circuit. Thus, the arc voltage shifts to zero and extinguishes the plasma. Repeated short circuit and/or globular transfer operations of the welder causes drastic variations in the arc voltage of the D.C. arc welding process. The liquid globules are blown away from the arc due to the turbulence caused by the plasma and are deposited onto the workpiece where they solidify. Consequently, large hemispheres called "spatter" are adjacent the weld bead and must be chiseled off to make the weld area more attractive. The use of a constant voltage which is high for spray transfer, as shown in FIG. 1, or is low for globular or short circuit transfer, as shown in FIG. 2, presents unwanted welding results so welding is to be performed in the specific area between spray transfer and globular transfer; however, the many variables in the welding process change the voltage defining this area for a weld process. If a voltage is set for one group of variables, the weld process is not optimum when one or several of these variables change.

Although the present invention is particularly applicable to voltage control welding, the same problem exists for current control welding. In pulse welding, the many variable parameters also affect the quality of the weld and requires both quality control of the wire and shielding gas as well as adjustment of the other variable parameters. These compensations in all types of arc welding cannot be made using a closed loop, adaptive system based upon a given variable or an open loop control system such as constant voltage, constant current or constant pulse wave shape.

THE INVENTION

The present invention analyzes the raw arc voltage only and determines the rate of negative dips or spikes, defined hereafter as spatter events E. The raw arc voltage is shown in the voltage traces of FIGS. 1, 2, 3 and 3A which, in practice, is unfiltered to remove high frequency, i.e., above 10 kHz, and thus eliminate random power supply noise. By selecting a desired rate in the range of 10–30 events per second, the output of the arc welding process is controlled to maintain the actual rate at the desired rate. Since this rate is drastically below the rate of shorts in a short circuit mode of operation and globular transfer (i.e. over about 80 spikes per second) detecting the events E can including sporadic shorts and minor globular events. Thus, counting spatter events can include the occasional short or globular transfer without distracting from the invention. This ability to include the negative spikes resulting from globular and short transfers simplifies event detection and is shown in FIGS. 28, 29 and 29A. In summary, spatter events E are detected in the raw arc voltage (with high frequency removed) and are used adaptively to control the welder output an arc at variable output levels to give the desired spatter event rate. This control concept maintains weld quality with process variables. In a limited extent spatter events are negative spikes (a) in the range of 1–6 volts, (b) above 7–10 volts, or (c) greater than 1–2 volts. In practice the average arc voltage is compared to the raw arc voltage to determine the events.

In accordance with the present invention, the D.C. arc welding process is controlled at a specific output condition which, in a voltage control mode, is at a voltage in the specific area between a high voltage spray transfer shown in FIG. 1 and the low voltage globular or short circuit transfer shown in FIG. 2. Not only is this new process controlled by a closed loop system between the two modes of operation illustrated in FIGS. 1 and 2, but also it is controlled at a specific area between the two modes as generally shown in FIG. 3. The set arc voltage of the D.C. arc welding process is maintained at a variable magnitude or level resulting in the desired welding operation.

In accordance with the invention, the method, system or controller maintains the output arc voltage, current or pulse at a level which will cause a desired welding procedure and result irrespective of the changes in parameters surrounding such D.C. arc welding processes. In accordance with the preferred application of the invention, the arc voltage is controlled at a value resulting in a repetitive consistent quality welding procedure which essentially ignores the variations in the many parameters associated with D.C. arc welding and produces a superior weld over a weld obtained by a constant voltage process. This same method, system or controller is used to control other output parameters in various arc welding processes. In accordance with the present invention there is provided a method of controlling, in real time, a D.C. electric arc welding process wherein welding wire is advanced toward a workpiece while an arc voltage is applied across the advancing wire and the workpiece. This method comprises the steps of detecting spatter events as a negative spike greater than about 1–2 volts. A "spatter event" is a distinct downward dip or negative spike in the arc voltage which spike in the limited aspect is generally in the range of about 1–10 volts. In a limited aspect, the maximum downward plunge is 6 volts, but in practice it is generally 10 volts to include more spikes. In another aspect, the spike is at least about 7–10 volts above ground, i.e. zero volts. The events are identified in another way in Kramer U.S. Pat. No. 5,369,243 as negative spike, different from actual shorts, without regard to globular transfer. A "spatter event" is a negative spike that is not a short. However, in determining spatter events occasional shorts can be counted as a spatter event. The "spatter event" also excludes globular transfer disturbances but occasional globular induced negative spikes can be counted as a spatter event. These small voltage deviations from the arc voltage, i.e. spatter events, are shown in FIG. 3 for voltage control welding and in FIG. 3A for pulse welding and can be measured by appropriate circuitry or software. The software determines when the raw arc voltage dips downward by at least a minimum amount and do not exceed a maximum amount to distinguish the negative disturbances from both globular transfer and short circuit transfer. The "spatter event" is distinguished from a short or globular created voltage dip as shown in FIG. 2, wherein the deviations are drastic and progress downwardly by over 10 volts and results in a voltage near 7–10 volts above zero. Thus, a spatter event, is created by the formation of a molten ball on the end of the advancing welding wire, which ball is not large enough to cause a globular transfer or short transfer. The spatter events occur when the molten metal is formed on the end of the electrode and is ready to be propelled through the arc toward the workpiece, not as a globular uncontrolled large mass, but as a relatively small molten droplet. The droplet is between a spray transfer and a globular transfer. When this occurs, a series of spatter events occur repeatedly at a rate determined by the arc voltage of the welding process in voltage control and other parameters in other modes of welding.

In counting the spatter events in the range of rates used in the present invention, both a globular transfer or a short occasionally occur. Thus, these sporadic negative spikes are counted as "spatter events." This procedure facilitates determination of spatter events in a practical sense.

Although spatter events are considered negative spikes above shorts, it is conceivable that these spikes are the result of instantaneous shorts 32d as shown in FIG. 30, and are only exhibited as small negative spikes due to the filtering effect of the measuring equipment.

It is has been found that there is a metal transfer phenomena in a limited voltage range between spray transfer and globular transfer where small particles are formed and are transferred through the arc to the workpiece. These particles are larger than the particles in a spray transfer. In accordance with the invention, these spatter events, between the spray transfer procedure and the globular or short circuit transfer procedure, after being detected, are processed in a microprocessor or other control device in relationship to real time to determine the real time rate of spatter events. After the real time rate of spatter events is determined, a desired rate of spatter events is selected and the arc voltage or other output parameter of the welding process is adjusted to shift the real time rate of spatter events to the desired rate of spatter events defining a specific area between spray transfer and globular transfer. This control method is the primary aspect of the present invention. In accordance with another aspect of the invention, the selected rate of spatter events or negative spikes is in the range of about 10–30 spatter events per second and is generally 20 spatter events per second. By maintaining the rate of spatter events or negative spikes at the selected value, the D.C. welding process is not constant voltage welding, but is a weld process maintained in a specific area between the spray transfer procedure in FIG. 1 and the globular procedure in FIG. 2. When pulse welding is being controlled by use of the present invention, the output is controlled by an input parameter that adjusts the pulses to obtain the desired rate of spatter events. The invention performs consistently and repetitively in the manner illustrated in FIG. 3, irrespective of the changes in the many parameters dictating the weld quality. By using the present invention, the spatter events per second control the arc voltage setting or other output controlling parameter of the welder and the resulting welding process.

In accordance with another aspect of the invention, there is provided a method of controlling in real time a D.C. electric arc welding process, as defined above, which process maintains the rate of spatter events at a desired rate. This control of the total welding process, not the wire, maintains the welding process at a specific voltage between spray transfer and globular transfer that assures repeated duplicative results in welding, irrespective of shifts and changes in the parameters dictating the operation and performance of the welding process.

Although the invention is particularly applicable to controlling the voltage in a D.C. welding process where a voltage control is used to shift between spray transfer at high voltages and short circuit transfer at lower voltages, the invention can be used in various modes of arc welding, such as pulse welding. In a pulse welding process, the voltage is controlled to create a series of current pulses as shown in the lower graph of FIG. 3A. In this type of arc welding, negative voltage spikes 80 and 82 occur at the end of certain pules $P_c$. The arc voltage is the average of voltage $P_v$. These are also "spatter events" that can be detected and used to control the output of the pulse welder by either the adaptive type use of the present invention or the periodic type use of the present invention.

Another aspect of the present invention is the provision of a controller for a D.C. electric arc welding process, of the type defined above, which controller comprises means for detecting spatter events, i.e. negative spikes greater than a given magnitude in the arc voltage, means for determining the real time rate of spatter events, means for selecting a desired rate of spatter events, and means for adjusting the arc voltage or other output parameter to shift the real time rate of spatter events to the desired rate. The negative spikes or spatter events are preferably detected by filtering out high frequency and comparing the raw arc voltage to the average arc voltage. This is preferably done digitally.

In accordance with a broader aspect of the present invention, a controller is provided for a voltage controlled welding process wherein the controller includes means for measuring the rate of spatter events and means for adjusting the arc voltage to maintain the measured rate of the spatter events in the range of 10–30 spatter events per second and preferably about 20 spatter events per second. Thus, the preferred implementation of the invention is distinguished from a constant voltage welding process and the invention will be described with particularity to a voltage control welding process compared with the standard prior art constant voltage welding process. However, the invention has broader applications and can be used to control the rate of spatter events in a pulse welding process or other welding process by adaptively adjusting an output parameter. In the primary use of the invention, this parameter is voltage.

By using the present invention in a voltage mode, a "spatter voltage" is determined by measuring the voltage at which the rate of spatter events, i.e. negative spikes greater than 1–2 volts, is in the range of 10–30 spatter events per second and preferably in the general range of 20 spatter events per second. This determined voltage is the "spatter voltage" and can be used for a short time, i.e. times less than one minute, in an alternative procedure for practicing the present invention. The spatter voltage can be used as the closed loop control voltage for the welding operation. Such closed loop control is based upon the measured rate of spatter events and is used for short weld cycles as performed by automatic equipment in mass production. The spatter voltage is measured before each cycle, or at periodic times in a cycle, which periodic time is less than about one minute. The weld process for a cycle is held at the adaptive spatter voltage. This is not the preferred use of the present invention and is a mere approximation. The invention updates the output on a generally real time basis to maintain the selected rate of spatter events. The updates can be made periodic without departing from the invention.

The spatter voltage of a total welding process (i.e. the arc voltage resulting in the selected spatter event rate) can be determined by plotting a S curve, which is the rate of spatter events in the actual welding process as a function of the D.C. arc voltage of the process. By intersecting the lower portion of this weld process curve with a 45° tangent line, the point of intersection between the gradual portion of the S curve and the more abrupt portion of the S curve is the operating voltage to which the welder should be controlled when operating the welder in a voltage mode of welding with several variables. This intersection point is the "spatter voltage" for the process at any given time and is the arc voltage used in accordance with the primary implementation of the present invention for controlling the welder and the welding process. As the process changes either in setup or in operation, the process S curve changes as does the detected "spatter voltage." The invention adjusts the welding process output to maintain the selected rate of spatter events.

The primary object of the present invention is the provision of a method, system and controller for adaptively controlling the output of an arc welder by detecting negative spikes, preferably spatter events, in the arc voltage and adjusting the output to maintain the rate of events at a desired rate in the general range of 10–30 events per second. "Spatter events" are negative spikes not caused by globular transfer or short circuit transfer; however, at the desired rate such transfers occur only occasionally. Thus, in a broader sense, "spatter events" are defined as any negative spike greater than a given voltage, such as 1–2 volts. Spatter events when counted can be determined conveniently by such negative spikes so their exact origin is unimportant to the practice and understanding of the invention.

Another primary object of the present invention is the provision of a method and apparatus or controller, which method and apparatus or controller operates a D.C. electric arc welding process with the same quality weld as parameters dictating the quality of the weld are changed either intentionally or otherwise. In the preferred implementation of the invention, the welding process is a voltage mode that operates at a controlled arc voltage, which adjusted arc voltage produces a quality weld with little oxide dust and spatter while producing a uniform weld bead having a contour and penetration distinct from a constant voltage welding for the same welder and variables. The method and controller are not dependent upon wire characteristics, gas composition or other primary welding variables.

Another object of the present invention is the provision of a method and apparatus or controller, as defined above, which method and apparatus or controller utilizes the rate of spatter events to determine the voltage or other output parameter at which the arc welding process is operated to compensate for variations in the many parameters of the welding process.

Yet another object of the present invention is the provision of a method and apparatus or controller, as defined above, which method and apparatus or controller maintains the operation of a D.C. arc welding process operated in the voltage mode in the range between spray transfer and globular transfer and more particularly at a specific area between these two types of metal transfer, irrespective of variables in the weld parameters.

Still a further object of the present invention is the provision of a method and apparatus or controller, as defined above, which method and apparatus or controller maintains a D.C. electric arc welding process with very little smoke and no spatter. In addition, the weld profile or bead is smooth, continuous and concave to accumulate slag along the axial center of the weld bead as opposed to the intersection of the edges of the weld bead and the workpiece as found in constant voltage welding. This allows easy and complete slag removal and facilitates successful multi-pass welding. The bead also has an excellent depth of penetration.

A further object of the present invention is the provision of a method and apparatus or controller, as defined above, which method and apparatus or controller allows D.C. electric arc welding that is consistent and duplicative, irrespective of variations in the many parameters of the welding process.

The overriding objective of the present invention is a method and controller for dynamically following a voltage or other output parameter to maintain a preselected rate of spatter events, or, more broadly, negative spikes irrespective of variables in the welding process.

These and other objects and advantages will become apparent from the following description.

BRIEF DESCRIPTION OF DRAWINGS

FIG. 25 is a schematic block diagram showing the adaptive embodiment of the invention for use in controlling various output levels of a welder;

FIG. 25A is a schematic block diagram showing a modification of the embodiment shown in FIG. 25;

FIG. 26 is a schematic block diagram showing a variation of the system of FIG. 25 with certain added features;

PREFERRED EMBODIMENTS

Figure 1:
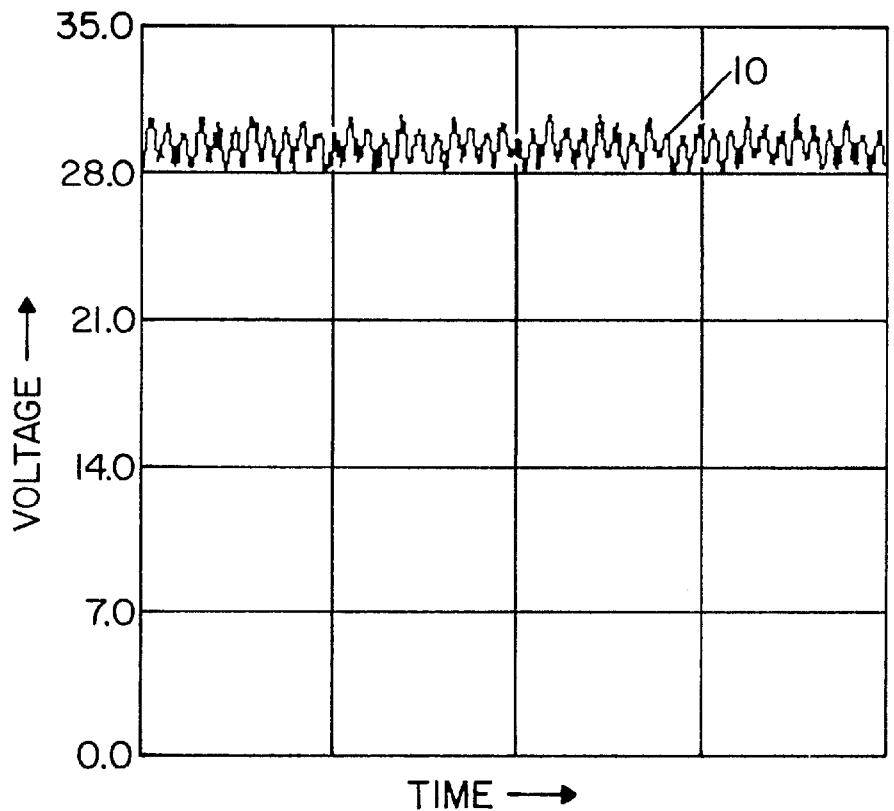
FIG. 1 is a graph of an electric arc welding process utilizing a high arc voltage to produce spray metal transfer.
Figure 1A:
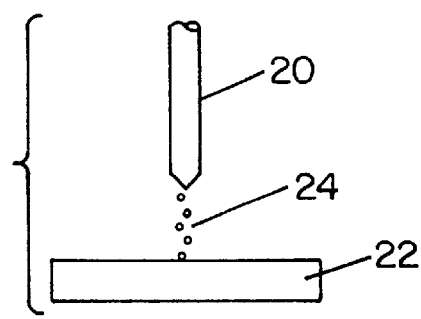
FIG. 1A is a schematic view of the spray metal transfer process obtained by using a high voltage as indicated in FIG. 1.

Referring now to the drawings wherein the showings are for the purpose of illustrating preferred embodiments of the invention only and not for the purpose of limiting same, FIG. 1 is a trace showing the actual arc voltage, in real time with high frequency filtered out, of a D.C. electric arc welding process schematically illustrated in FIG. 1A wherein the advancing welding wire or electrode 20 progresses toward workpiece 22. Arc voltage trace 10 across the wire and workpiece, is a high voltage, illustrated as about 29 volts, and, thus, creates a spray 24 of metal through the arc or plasma between the welding wire and the workpiece. By maintaining the arc voltage high, the voltage is relatively constant and produces a ripple trace at a constant arc voltage. This high voltage exhibits very little deviation from the set constant voltage and only exhibits a slight amount of welding noise. There are no apparent significant voltage deflections. The mode of metal transfer under this type of welding condition is referred to as spray transfer or plasma arc welding. Liquid metal streams from the wire to the workpiece through the electric arc caused by the arc voltage. The weld puddle remains relatively quiet; therefore, there are very little disturbances in the welding process. However, the high voltage of the plasma arc welding process can generate excessive heat and electromagnetic radiation. Additionally, high arc voltage vaporizes the iron in the electrode causing iron vapor to oxidize and condense on the relatively cool workpiece 22 as iron oxide dust. Spray droplets 24 are very small, do not stick to the workpiece and do not cause any substantial deviation in the set constant arc voltage 10. Due to excessive heat, electromagnetic radiation and the vaporization of the metal, this process is not always optimum for semi-automatic and automatic D.C. arc welding.

Figure 2:
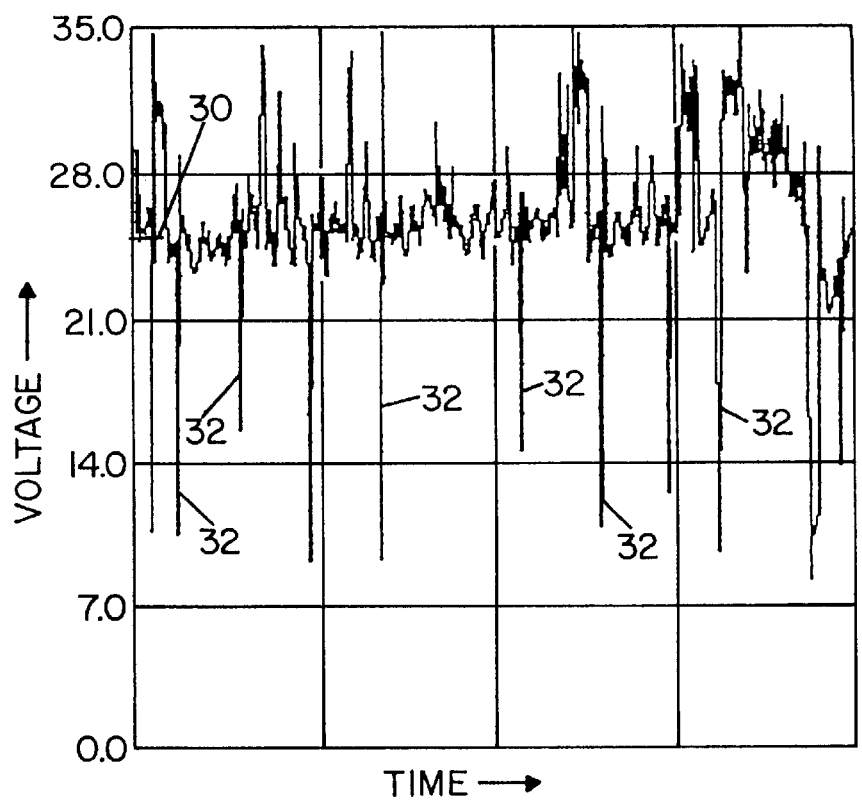
FIG. 2 is a graph of an electric arc welding process utilizing low voltage that produces globular or short circuit metal transfer.
Figure 2A:
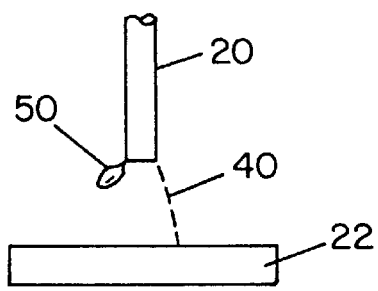
FIG. 2A is a schematic view of a globular metal transfer process obtained by operating in accordance with FIG. 2.
Figure 2B:
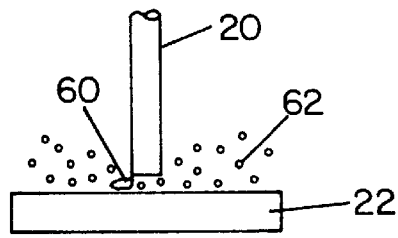
FIG. 2B is a schematic view of a short circuit metal transfer process operated in accordance with FIG. 2.

Referring now to FIG. 2, arc voltage trace 30 is reduced to approximately 25 volts. When the arc voltage is reduced drastically as indicated in FIG. 2, the voltage between wire 20 and workpiece 22 creates a distinct arc 40 which melts wire 20 to form large droplets or globules 50. When there is a release of the globules 50, there is a drastic deviation or negative spike 32 in arc voltage 30 as shown in FIG. 2. These negative spikes are above zero, but within 7–10 volts of zero. Indeed, if the arc voltage is reduced further, large droplets or globules 50 of FIG. 2A produce large molten balls 60 causing a short circuit transfer of molten metal. Large spheroids of molten metal are formed on the end of the wire. When a spheroid touches the workpiece, the molten spheroid starts a necking action caused by the electrical pinch action to separate the molten metal from the end of the electrode. This results in a drastic explosion or fuse that causes spatter 62. The voltage trace of globular or short circuit welding is illustrated in FIG. 2 and is characterized by drastic negative voltage deviations from the operating arc voltage at a rate of over about 60–80 deviations per second. In a typical situation for globular transfer, the arc voltage spikes drop from 25 volts to about 7–10 volts. In short circuit, welding wire is driven into the weld puddle to form a short circuit and the arc voltage is about zero and the arc is extinguished. Thereafter, the explosion occurs reestablishing the arc and repeating the short circuit operation. In both globular and short circuit transfer, the negative spikes occur rapidly and the wire is fed rapidly toward the workpiece which causes the abrupt negative voltage spikes 32. As seen in FIG. 2, there is substantial voltage instability immediately after negative spikes formed in globular transfer or after a short. The transfer is quite chaotic causing drastic movement of the weld puddle. The large globules 50 or molten metal spheroids 60 spin around the end of wire 20 from the side opposite to arc 40. The globules 50 grow larger with time and generally flop around before being transferred to the workpiece. The weld puddle is very turbulent as a result of the globular globlets impacting the puddle. When actual short circuit welding occurs, the welding wire actually melts away and then deposits the ball or spheroid, at which time the arc voltage has negative spikes that are near the zero level. With globules 50, as shown in FIG. 2A or short circuit transfer as shown in FIG. 2B, drastic disturbances occur in the set arc voltage 30, as shown in FIG. 2. This is substantially different than the generally quiescent condition of constant arc voltage 10 shown in FIG. 1. Both of these welding operations have serious disadvantages and are caused by changes in various parameters in the welding process if the welder is operated at a set constant voltage. During globular transfer and short circuit transfer there are shorts that do not give metal transfer. These shorts are instantaneous shorts that are momentary in duration.

It has been found that as parameters change, a constant voltage D.C. arc welding process shifts between spray transfer represented in FIG. 1A and either globular or short circuit transfer as represented in FIGS. 2A and 2B, respectively. Both of these extremes have process and appearance disadvantages, which are corrected by the use of the present invention.

Figure 3:
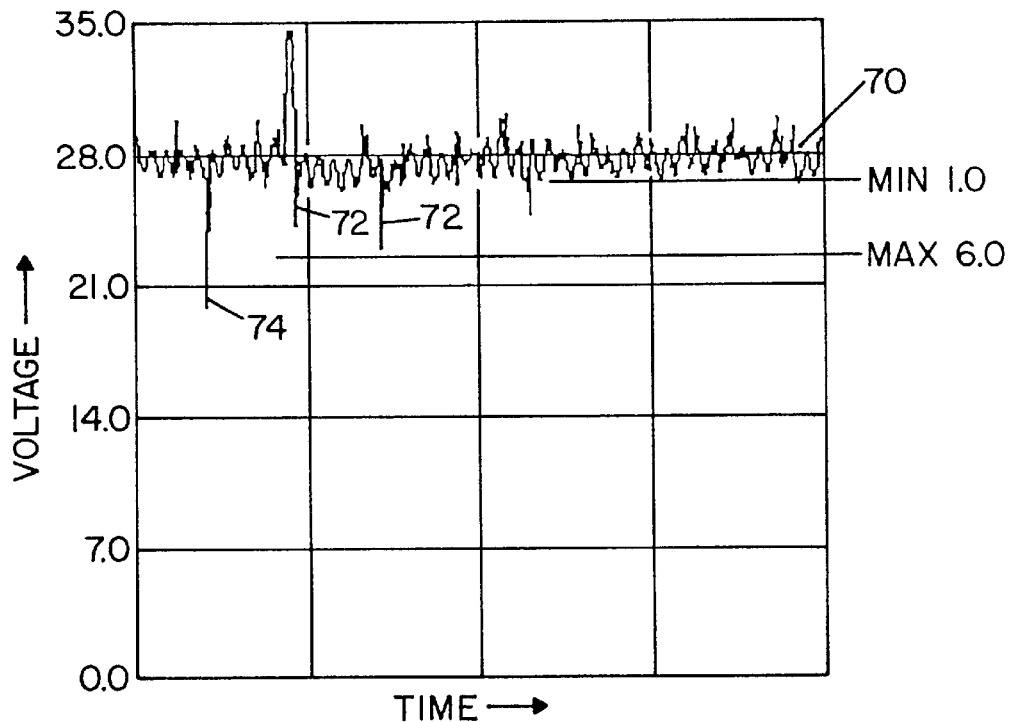
FIG. 3 is a graph of an electric arc welding process at a voltage between the voltages shown in FIGS. 1 and 2 and showing a series of spatter events that are detected to obtain the rate of spatter events for the total weld process for use in the present invention.

Referring now to FIG. 3, the arc voltage 70 is reduced from voltage 10, shown in FIG. 1, but is substantially greater than voltage 30 shown in FIG. 2. This arc voltage creates a phenomena indicated as a momentary, distinct voltage spike or dip 72. Dips 72 are referred to as spatter events and are in the narrow sense relatively small spikes which are in the range of a minimum of 1 volt and a maximum of about 6–10 volts below the set arc voltage 70. Negative spike 74 is at the higher end of this range and may or may not be recorded as a spatter event. Indeed, a spatter event could also be defined as a negative spike in the arc voltage which is greater than 7–10 volts above zero or in the broader sense, any negative spike greater than about 1–2 volts. The number of spatter events occurring during a time period is the rate of spatter events for arc voltage 70. This concept of measuring the rate of spatter events is used in the present invention as a parameter for controlling an actual welding operation irrespective of the quality or size of the wire, cored wire or solid wire, gas compositions, stick out, etc. A spatter event in the narrow sense is a negative spike in the general range of 1–6 volts. In a slightly broader sense a spatter event is a negative spike above about 7–10 volts. In the broadest sense, and in a sense easier to detect, a spatter event is any negative spike greater than about 1–2 volts. The negative spikes are measured from the raw arc voltage with high frequency removed or by a comparison of such raw arc voltage with the average arc voltage.

As the voltage is reduced from arc voltage trace 10 in FIG. 1, the negative voltage deviations, or spatter events, occur at an increasing rate. When welding at a low rate of spatter events, the arc voltage is held between the limits described in connection with FIGS. 1 and 2. As the arc voltage is decreased from constant voltage 10, spatter events start to occur. As the arc voltage is further decreased, the rate of spatter events increases. In accordance with the present invention, it has been determined that superior and uniform welding occurs at a spatter rate of approximately 20 spatter events per second. The rate of spatter events increases as the voltage decreases between the levels shown in FIGS. 1 and 2. The arc voltage which produces approximately 20 spatter events per second for the actual welding operation irrespective of the wire is referred to as the "spatter voltage" of the total welding operation. This is the voltage below which spatter begins to occur. Although the preferred selected spatter event rate is 20 spatter events per second for the actual welding operation, the invention envisions a range of such spatter event rates between 10–30 spatter events per second. The voltage for accomplishing the selected rate of spatter events, the "spatter voltage", causes a transition between spray transfer shown in FIG. 1A and globular transfer as shown in FIG. 2A. By using approximately 20 spatter events per second to determine the operating arc voltage for the practice of the welding process, irrespective of the wire construction, size or quality and irrespective of the gas composition, the workpiece is free of spatter and the weld bead is optimized with a concave top surface and deep penetration. Controlling the welder or D.C. welding process so the arc voltage is maintained at a desired rate of spatter events is unique and has been found to provide superior welds consistently irrespective of parameter changes in the welding processes. Thus, no matter what combination of independent variables and different parameters are experienced in the D.C. welding process, the weld is the same as long as the arc voltage is maintained at a known spatter event rate for the particular array of variables. Thus, by holding the arc voltage at a particular rate of spatter events, the D.C. welding process is maintained and duplicated at a quality process between spray and globular welding. The arc voltage at which the spatter event rate is approximately 20 spatter events per second can be easily determined by merely detecting the spatter events, determining the real time rate of spatter events, selecting the desired rate of spatter events and adjusting the arc voltage to shift the real time rate of spatter events to the desired rate of spatter events. Thus, the invention is a novel way of controlling a D.C. arc welder, which does not rely upon a voltage feedback or a current feedback, but maintains the operation of the welding process at a particular rate of spatter events. The spatter events control a welding operation. The invention does not test wire for quality and manufacturing consistency since this parameter is irrelevant to the success of the present invention.

FIGS. 1–3 illustrate applicability of the invention for voltage control welding processes, the primary implementation of the invention. However, the invention is broad and is also used to control pulse or welding where a series of current pulses $P_c$ created by voltage pulse $P_v$. Thus, the arc voltage is a series of pulses $P_v$ across electrode 20 and workpiece 22 and can be averaged to obtain the arc voltage to measure spikes 80, 82 appearing at the end of random pulses $P_v$. The number of these spikes is controlled by the invention. In pulse welding, the molten metal balls are formed and transferred as in voltage controlled welding and spatter events 80, 82 occur. These events are defined as negative spikes greater than 1–2 volts below the average voltage. By adjusting the pulses $P_v$ at the output of the welder to adjust the size and/or rate of the pulses, the rate of spatter events is adjusted as in the preferred implementation of the present invention. Thus, the invention is used to adjust the output of a pulse welder to control spatter events with the advantage that a selected spatter event rate gives the same quality weld irrespective of changes in the wire, shielding gas and other weld quality determinative.

Figure 3A:
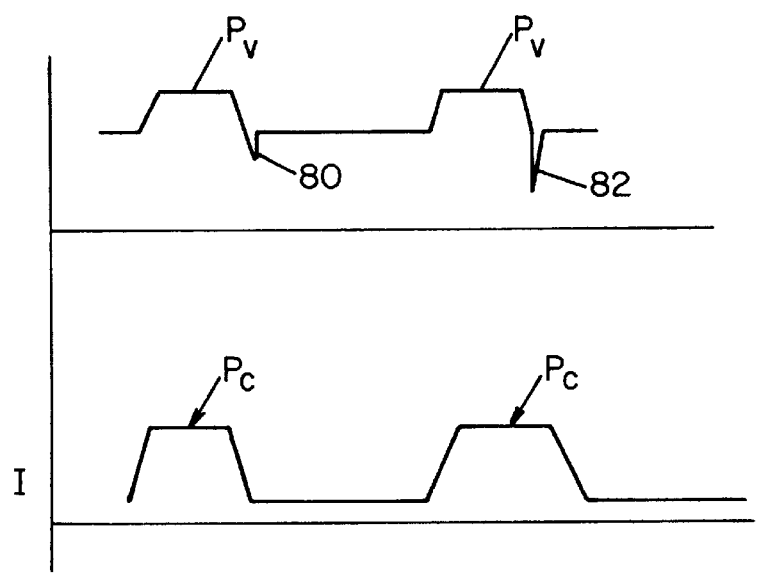
FIG. 3A is a graph of voltage and current in a pulse welding process illustrating the occurrence of a spatter event or negative voltage disturbance.
Figure 4:
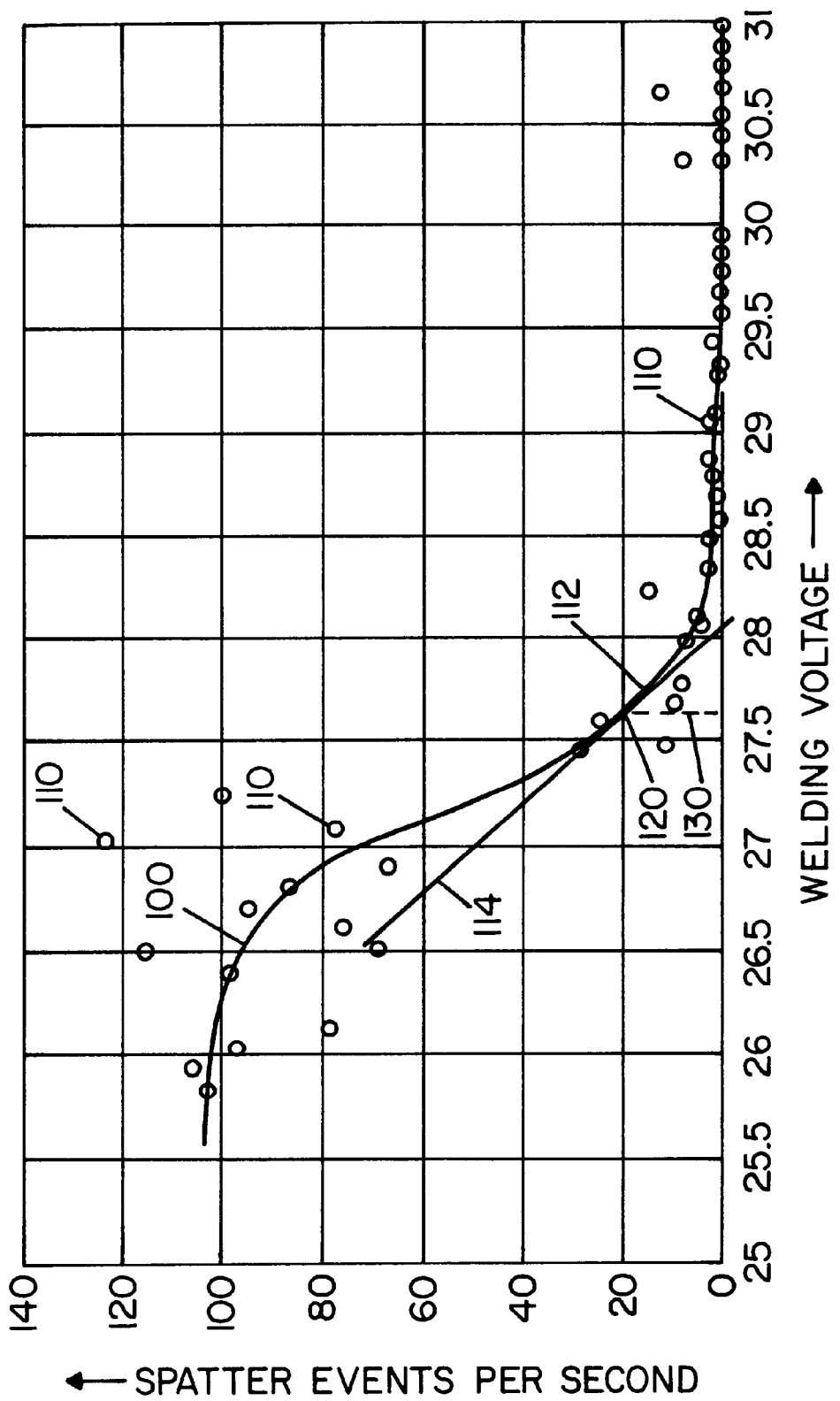
FIG. 4 is a graph showing a S curve for the total weld process and constructed as rate of spatter events as a function of arc voltage with an intersection to define the actual "spatter voltage" of the weld process.

To illustrate the arc voltage to be used in the D.C. welding process in the voltage mode use of the invention, sometimes referred to as a "constant spatter voltage" mode, to obtain the desired consistent and duplicative quality weld, a high arc voltage is decreased at a small rate such as 0.2 volts per second. At each instance, the spatter events are detected and counted over a period of time to give a rate of spatter event. The spatter events, either in the narrow or broad sense, are counted and factored by time to give the rate which can project on a computer screen as a function of the actual arc welding voltage for the process. This procedure results in S curve 100 for the actual welding process in FIG. 4. Curve 100 takes into consideration all variables of the weld process. Data points 110 are calculated rates of spatter events 72 at each arc voltage. Curve 100 is at zero spatter events at high voltages. This is the spray condition shown in FIG. 1. As the voltage decreases in a stepped manner, spatter events start to occur. Once the spatter events begin to occur, they increase rapidly so that the rate of these events forms the shape of S curve 100 for the welding process. The number of spatter events per second levels off at 80–140 at relatively low voltages. At that time there is a globular or short circuit transfer with spikes 32 as shown in FIG. 2. Reduced voltages after the lower knee 112 create the welding process shown in FIG. 2. A 45° tangent 114 intersects the lower knee 112 of curve 100 at a point 120 to give the arc voltage for operation between the rapid spatter event sections of curve 100 and the low spatter rate sections of the curve. Point 120 defines the rate of spatter events that is desired routinely and repetitively for controlling the welding process. This rate is illustrated in FIG. 4 as being 20 spatter events per second. At point 120 arc voltage 130 is voltage to which the welding process is controlled for the illustrated S curve. As the welding process varies or when the wire or shielding gas is changed, voltage 130 also shifts and a new S curve is operative. This voltage 130 is illustrated as being about 27.5 volts D.C. By using curve S for a particular welding process, the arc voltage is selected by determining when 20 spatter events per second occur. Thus, the rate of spatter events per second is to be maintained at 20 events per second by maintaining the voltage at 27.5 volts as long as the welding process is identical. In the welding process, the rate of spatter events changes as the process changes, either in a run or from set up to set up. If relevant, and as illustration only, a new S curve is applicable with a new spatter voltage 130. The arc voltage of the welder is adjusted to maintain the operation at the spatter voltage with the rate of spatter events at 20 events per second for the welding process. A similar curve is created when the output of a pulse welder is adjusted in the process represented in FIG. 3A. Thus, a pulse welder can use the invention by controlling its output to maintain a selected rate of spatter events. This provides the control that produces repetitive and duplicative quality welding by using the present invention.

The control arc voltage or spatter voltage 130 changes as various parameters of the welding process change. The shift in the spatter voltage is determined by measuring the rate of spatter events and changing the arc voltage of the welder to maintain the rate at approximately 20 spatter events per second for the actual welding process. Curve 100 is a spatter event curve for a specific weld process and merely depicts the general profile of such a curve. The curve changes as each of the various parameters change during the process. A different spatter event curve exists for each weld process and for each instance in an operating process. Thus, control of the process is independent of the welding parameters. The arc voltage for each welding process or for all times in the process is 20 events per second plus or minus 10 spatter events per second. Thus, the rate of spatter events which will practice the invention is in the general range of 10–30 spatter events per second. By selecting a rate in this range and maintaining this rate consistently during a welding process, a consistent duplicated quality weld procedure is accomplished. This invention controls the arc voltage to maintain a desired rate of spatter events, which desired rate is normally 10–30 spatter events per second. In some special methods, the selected rate can be a higher number, such as about 30–60 spatter events per second. This is still generally before fall globular transfer.

Figure 5:
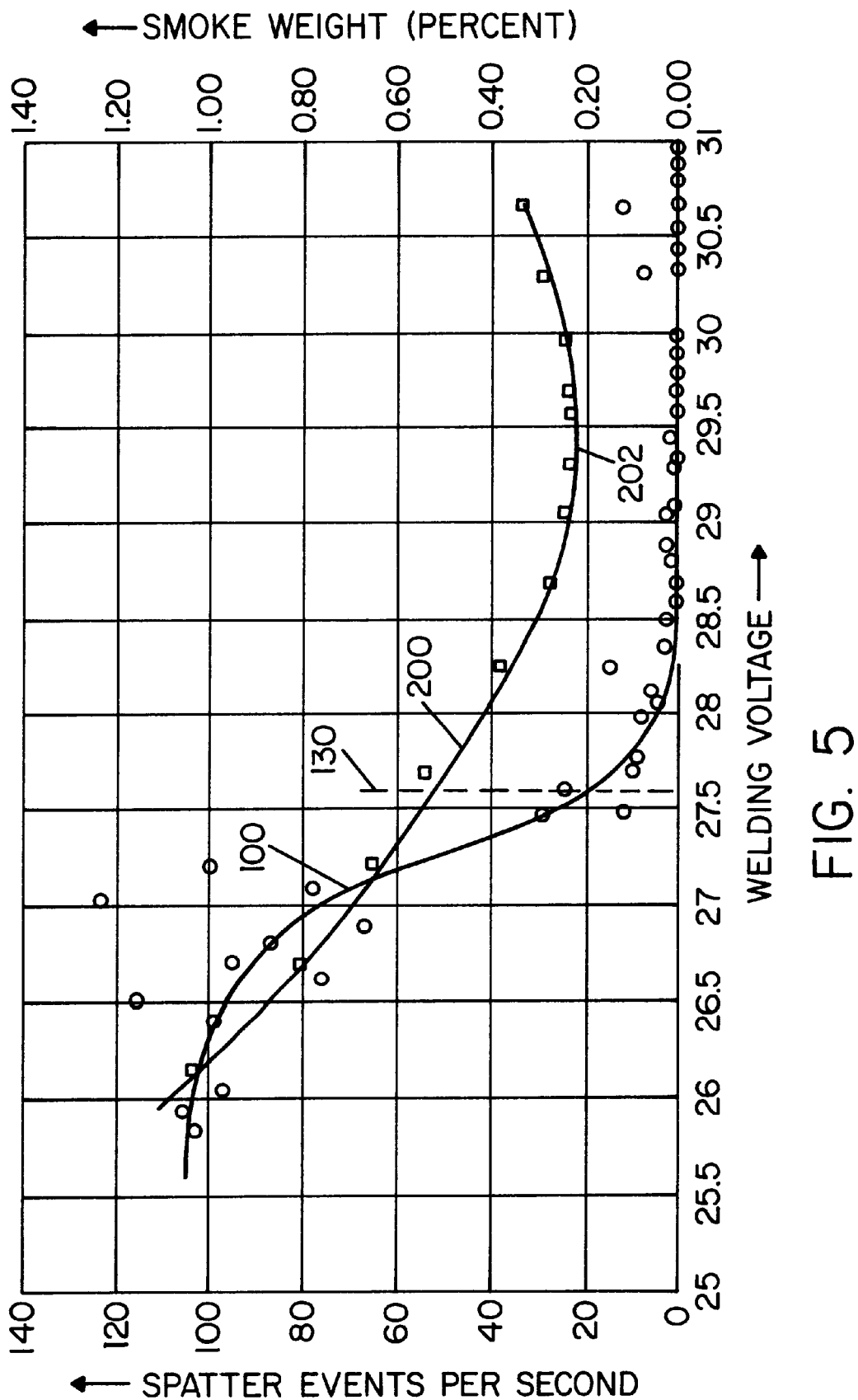
FIG. 5 is a graph showing smoke generated by the welding operation as a function of the arc voltage superimposed over the process curve illustrated in FIG. 4.

Referring now to FIG. 5, the S curve 100 from FIG. 4 for the "constant spatter voltage" use of the invention has superimposed thereon a curve 200 which is the weight of smoke plotted as a function of the arc voltage as superimposed upon curve 100. The minimum smoke is at point 202 of curve 200 which point is less than 2 volts D.C. above spatter voltage 130. At higher voltages, the spatter consists of very small metal spheroids so the weight percentage of smoke remains relatively low. However, the high heat of the arc volatilizes a large amount of steel which is quickly oxidized to iron oxide dust. This increased percentage of dust causes smoke curve to rise slightly at higher arc voltages. The smoke curve for cored electrode shows a more significant weight percentage minimum which is closer to the spatter voltage 130. This occurs because there are volatile components in the core of the electrode. At very low voltages, a large amount of spatter is produced and the extracted smoke has a high concentration of spatter of different sizes. Iron oxide aerosol is also present because the liquid weld puddle is disturbed by shorting electrodes within the puddle. The lower voltages are not used in practicing the present invention even though such voltages would not necessarily result in the welding process illustrated in FIG. 2A.

Figure 6A:
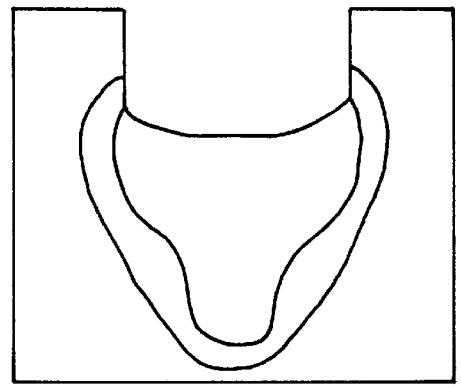
FIGS. 6A–6B are cross-sectional views showing the weld bead obtained by use of the method and controller of the present invention.
Figure 6B:
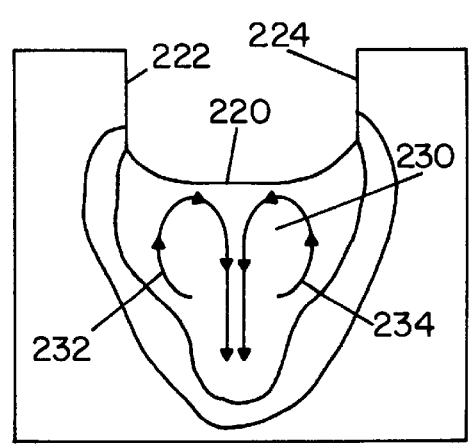

It has been found that use of the present invention in the voltage mode of implementation, i.e. "constant spatter voltage control" mode, results in a weld bead that has a concave upper surface and is quite uniform. The use of a spatter voltage control of the present invention is illustrated in FIGS. 6A–6B. FIG. 6B is a duplicate of the actual bead in FIG. 6A. The weld bead 220 between sides 222, 224 of a test groove is uniformly concave with a lower contact angle between the weld bead and the sides 222, 224. There is no undercut at the sides or edges of the test group.

Figure 7A:
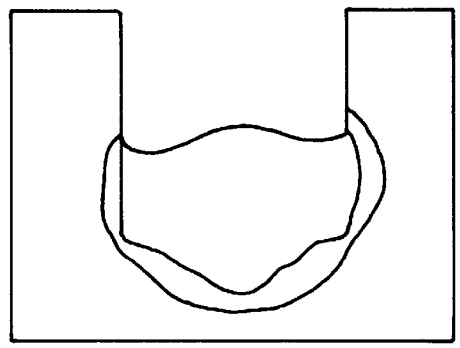
FIGS. 7A–7B are similar to FIGS. 6A–6B illustrating the operation of a constant voltage welding process with the same parameters.
Figure 7B:
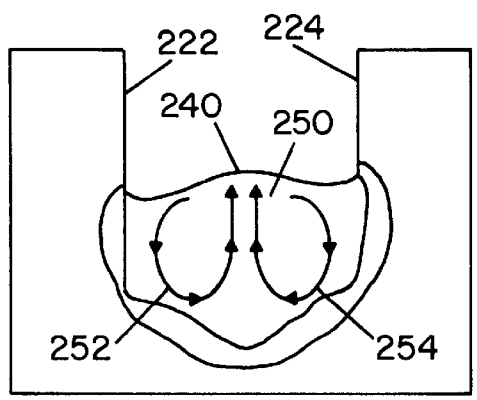

This is because the molten metal when using the spatter voltage control concept of the present invention appears to circulate in the path 230 as shown in FIG. 6B. This molten metal path includes circulation currents 232, 234 which are in a downward direction at the center of the weld pool forming weld bead 220. The molten metal currents sweep upward adjacent each side or edge of the test groove. All tests using a spatter control method where the arc voltage is held at voltage 130, which voltage changes with changes in the spatter event rate, have the concave top on the weld bead. This can only be explained by the circulation path 234. The uniformly concave weld surface produced by the invention results in an absence of stress risers in the center of the bead and very low weld-substrate contact angles. Additionally, the absence of undercut results in a very high weld fatigue resistance for the weldment. A constant voltage process using the same parameters is illustrated in FIGS. 7A–7B wherein the voltage is maintained constant without regulating to spatter voltage 130. In this instance, the constant voltage weld produces a bead 240 which is convexed. The molten metal has a circulation path 250 with circulation currents 252, 254, as shown schematically in FIG. 7B. This constant voltage weld bead is convex at the center and concave at the edges. Thus, there is an undercut at the edges and the molten metal does not completely fill the arced out cavity. Additionally, slag collects at the edge portions of bead 240 making it very difficult to remove the slag after the welding operation was completed. The hump or convex portion in the center of the bead can result in a stress riser which reduces fatigue resistance of the weldment. FIGS. 6A–B and 7A–B compare the present invention using a constant spatter voltage, i.e. a voltage to maintain a selected rate of spatter events with a standard constant voltage electric arc welding process. As the parameters of the welding process change, the bead shape in the constant voltage mode of operation also changes. In the "constant spatter voltage" controlled welding process of the present invention, the bead remains as shown in FIGS. 6A–6B, irrespective of changes in wire, shielding gas, etc.

In electric arc welding of the voltage controlled type, there is a single control phenomena which can obtain the same result irrespective of variations in the myriad of welding parameters. Every weld, no matter what changes there are in the welding parameters, is the same by using the rate of spatter events as taught in the present invention. This same situation exists for other welding processes, such as pulse welding illustrated in FIG. 3A. It is therefore now possible, using the present invention to produce nearly perfect welds independent of parameter settings by merely welding with the arc voltage, in voltage control mode, or other output parameters in other welding processes, shifted to maintain a selected rate of spatter events. The welding process of the present invention is controlled to maintain the rate of spatter events in the range of 10–30 spatter events per second and preferably about 20 spatter events per second. The use of this selected rate of spatter events always obtains the same welding operation irrespective of changes in the various parameters. The present invention controls the D.C. arc voltage or other applicable output parameter of a welding process by maintaining approximately 20 spatter events per second. The arc voltage at this rate of spatter events is referred to as the spatter voltage in a constant spatter voltage use of the invention, even though such arc voltage is not constant. Metal droplets begin to form at the end of the wire and electrode at or near the spatter voltage. The spatter event curve 100 shown in FIG. 4 illustrates an operating curve for a voltage controlled use of the invention. The same type of curve is found for output changes in pulse welding. An algorithm in a microprocessor or other computer device maintains the arc voltage at the spatter voltage to obtain a selected rate of spatter events or the output of a pulse welder to obtain such selected rate. By a closed loop system, a controller maintains the rate of spatter events at a desired rate. In the preferred embodiment, the desired or selected rate is 20 spatter events per second. The spatter events can be detected by detecting negative disturbances or negative spikes which are differentiated from actual short circuit events. Short circuit events are deviations down to about zero volts and have a time width greater than about 500μ sec. By providing a threshold in the detection process, spatter events can be defined as deviations or spikes in the arc voltage in the general range of at least 1 volt and not more than 6–10 volts with a time less than 500μ sec or a low point of more than 7–10 volts above ground or zero. This limiting concept will distinguish a spatter event from an actual short circuit transfer event. However, when controlling the rate of events at 10–30, actual shorts can be included as spatter events without departing from the invention. Since spatter voltage 130 can be determined by starting with a high arc voltage and decreasing along the S curve 100 shown in FIG. 4, the spatter voltage is reached before a high rate of spatter events occurs. Clearly the spatter voltage is obtained before the welding process shifts into a full globular operation, defined as all negative spike being greater than about 10 volts. The globular may be an incipient or instantaneous short if the globular hits the workpiece and then bounces away. In one implementation of the invention, the computer program counts the number of events at any voltage level, as described in FIGS. 11 and 11A, and calculates the rate of spatter events for that voltage, as disclosed in FIG. 13. If desired, the S curve 100 shown in FIG. 4 can be constructed. However, this is not necessary in practicing the invention since the control is a number and not on a fixed curve.

In the preferred embodiment of the invention using a "constant spatter voltage" mode, "spatter voltage" occurs at 20 spatter events per second. If the number of spatter events increases, the computer program or controller increases the voltage until the spatter events return to 20 events per second. In a like manner, if for some reason the number of spatter events decreases to less than approximately 4 spatter events per second, the arc voltage is decreased and the number of spatter events is increased to 20 spatter events per second. The lower number of spatter events at higher voltages is not as troublesome as higher spatter events at lower voltage. Low rates of spatter events indicate that there is a shift toward spray transfer as shown in FIG. 1A. A feedback or closed loop control system maintains the detected rate of spatter events at the preselected rate of spatter events and therefore maintains the arc voltage at spatter voltage 130. The controller for this purpose can be a programmable controller or other control device which will calculate the spatter event rate and hold the rate at the desired value by changing the arc voltage to keep a "constant spatter voltage." Each welding configuration has a new and usually different curve 100. This curve changes during operation. However, every spatter voltage curve is a generally S shaped curve. Such curve has a tangent with line 114 as shown in FIG. 4 to locate the spatter events per second which are optimum for the particular welding parameters. This point is in the lower knee and before the rapidly rising portion of the curve. It has been found that this value is approximately 20 spatter events per second for a vast majority of the spatter event curves. This rate is the preferred selected rate of the invention. A feedback computer program maintains a constant spatter voltage where the events per second are maintained at the desired rate, in practice 20 spatter events per second. The term "constant spatter voltage" does not mean a constant arc voltage. It means an arc voltage that gives a constant control parameter, i.e. a constant spatter event rate. This parameter is used in all implementations of the present invention.

Figure 8:
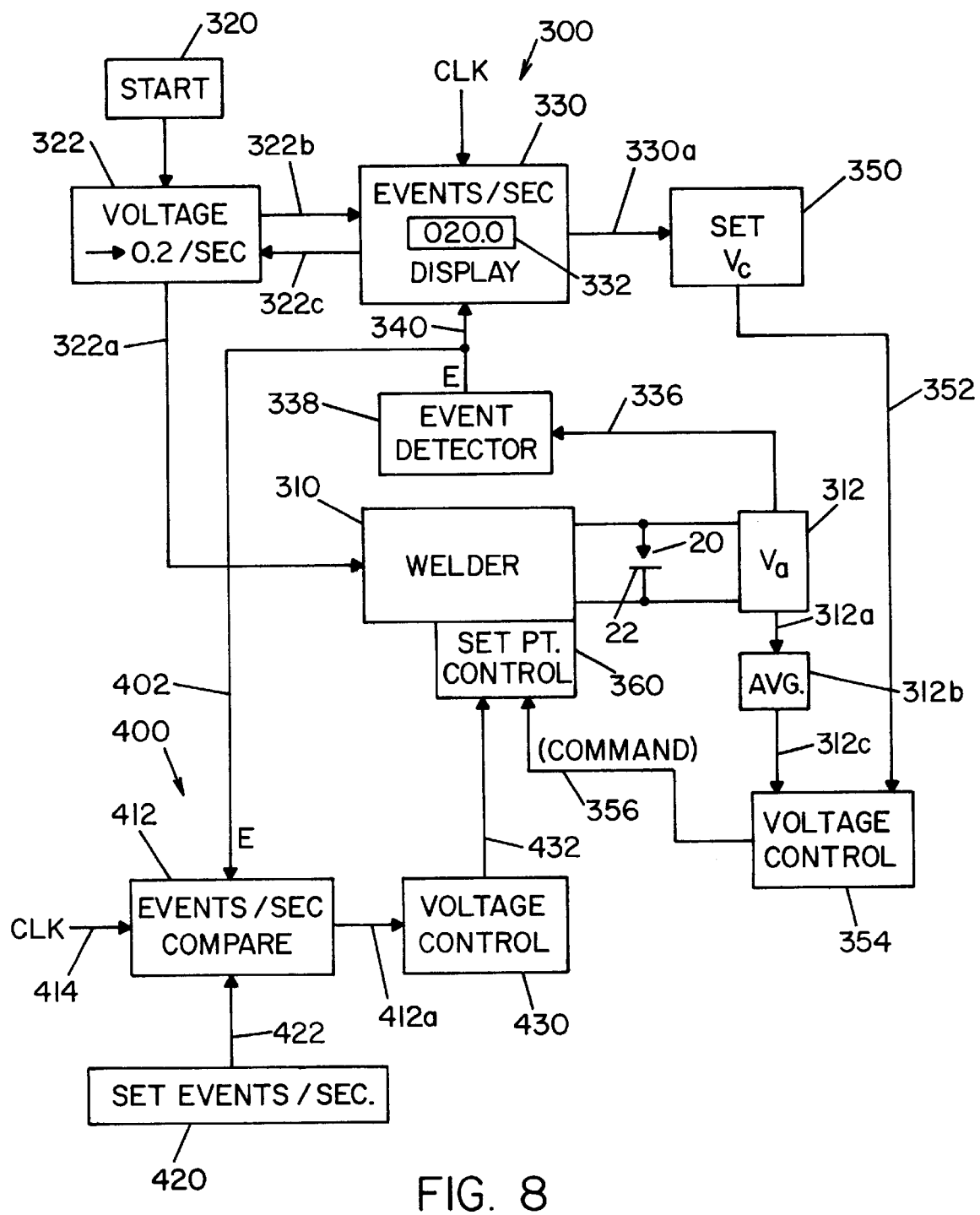
FIG. 8 is a schematic block diagram illustrating certain implementations of the preferred embodiment of the present invention using voltage as the corrective control command to the power supply.

A block diagram of a program for practicing the present invention to be performed in a microprocessor or other appropriate controller is schematically illustrated in FIG. 8 wherein a microprocessor control or other appropriate control device is schematically indicated as controller 300 for a D.C. arc welder 310 to perform a welding operation by applying an arc voltage between wire 20 and workpiece 22. The arc voltage is read continuously by an appropriate sensor 312 with a raw voltage output 312a that is averaged by averager (in practice digital) 312b to provide an arc voltage level on line 312c. The raw voltage can be processed as an analog signal, but preferably it is a digital signal obtained by the procedure shown in FIG. 31. The raw voltage is normally filtered by a low pass filter removing high frequency above about 10 kHz. It is still, however, the raw arc voltage. In one use of the invention the controller is started at a high voltage, such as 30 volts D.C. for welder 310. Function block 320 indicates that the arc voltage is incrementally decreased by function block 322 having an output 322a controlling the arc voltage of welder 310. Output 322b tells calculation stage 330 the present arc voltage of the welder. As the arc voltage is decreased incrementally the curve 100 shown in FIG. 4 is being followed by the controller. After the spatter voltage is reached, line 322c gives a stop command to the voltage incrementor 322. Arc voltage $V_a$ is incrementally decreased at both the calculation stage 330 and at welder 310. Calculation stage 330 has a display 332a for displaying the rate of spatter events. This rate is determined by reading events E on line 340. The raw arc voltage $V_a$ on line 336 (same as 312a) is processed by event detector 338 to create a signal at each spatter event. See FIGS. 11, 11A, 29 and 29A. When a particular rate of spatter events, which in the present invention is 20 events per second, is read and displayed on screen 332, calculation stage 330 creates a stop input on line 322c to voltage incrementor 322.

As so far described, it is assumed that the starting voltage is greater than the spatter voltage; however, if the detected rate of spatter events determined by calculation stage 330 is greater than the selected rate, i.e. in practice 20 events per second, the starting voltage is too low and increments 322 gradually increases the arc voltage until the rate is decreased to the selected rate of spatter events. The rate of increasing or decreasing of the voltage can be greater or less than 0.2 volts/second. The starting voltage is near the desired voltage, since it is the last setting for welder 310 so the initial setting of controller 300 is quite rapid.

The output voltage of welder 310, when calculation stage 330 reads 20 events per second, is the "spatter voltage" for the particular welding variables of the current welding process. This voltage of the welder to obtain 20 spatter events per second appears on line 330a to set the voltage of control 350 to the detected spatter voltage to the actual welding process being performed. This initial set voltage $V_c$ is communicated by output 352 as the reference input voltage of comparator 354. The averaged arc voltage on line 312c is compared to the initial detected spatter voltage on line 352. The voltage on line 352 is the initial spatter voltage that obtains a rate of spatter events of 20 spatter events per second. Comparator 354 compares the initial spatter voltage $V_c$ to the actual arc voltage. The difference between the initial spatter voltage and the actual arc voltage is an error signal or corrective command signal on line 356. The corrective command signal is used to adjust the control 360 of the welder 310 to maintain the voltage at the initial spatter voltage. A closed loop control system reads the actual arc voltage and maintains the arc voltage at the initial spatter voltage determined by the output of calculator stage 330.

In the illustrated embodiment of the present invention using the upper portion of FIG. 8, the corrective control command signal is used to adjust the voltage of the power supply for welder 310. The invention is broader and is also used to adjust other electrical control set points by control 360 to maintain the spatter events per second at a selected level. Command signal in line 356 can be a current command, a pulse size or rate command, etc. In these situations, control 360 determines the parameter being controlled to give the initial setting as explained with the preferred voltage control.

By using controller 300, each welding process with its different parameters is immediately brought to the spatter voltage or other control feature of the process. The process is maintained at the detected spatter voltage. Of course, as the process is repeated for each cycle or short run with the same parameters, it is not necessary to repeat the process of determining the initial spatter voltage during a given weld cycle. Thus, controller 300 is used to maintain the arc voltage at the initial spatter voltage for each welding cycle. This method is used each time a new welding operation is started. This operation gives approximates of the present invention and is equivalent, but not optimum use of the invention. It can be used in only limited short cycles that do not change during the welding operation. A person using this concept is using the present invention.

Figure 8A:
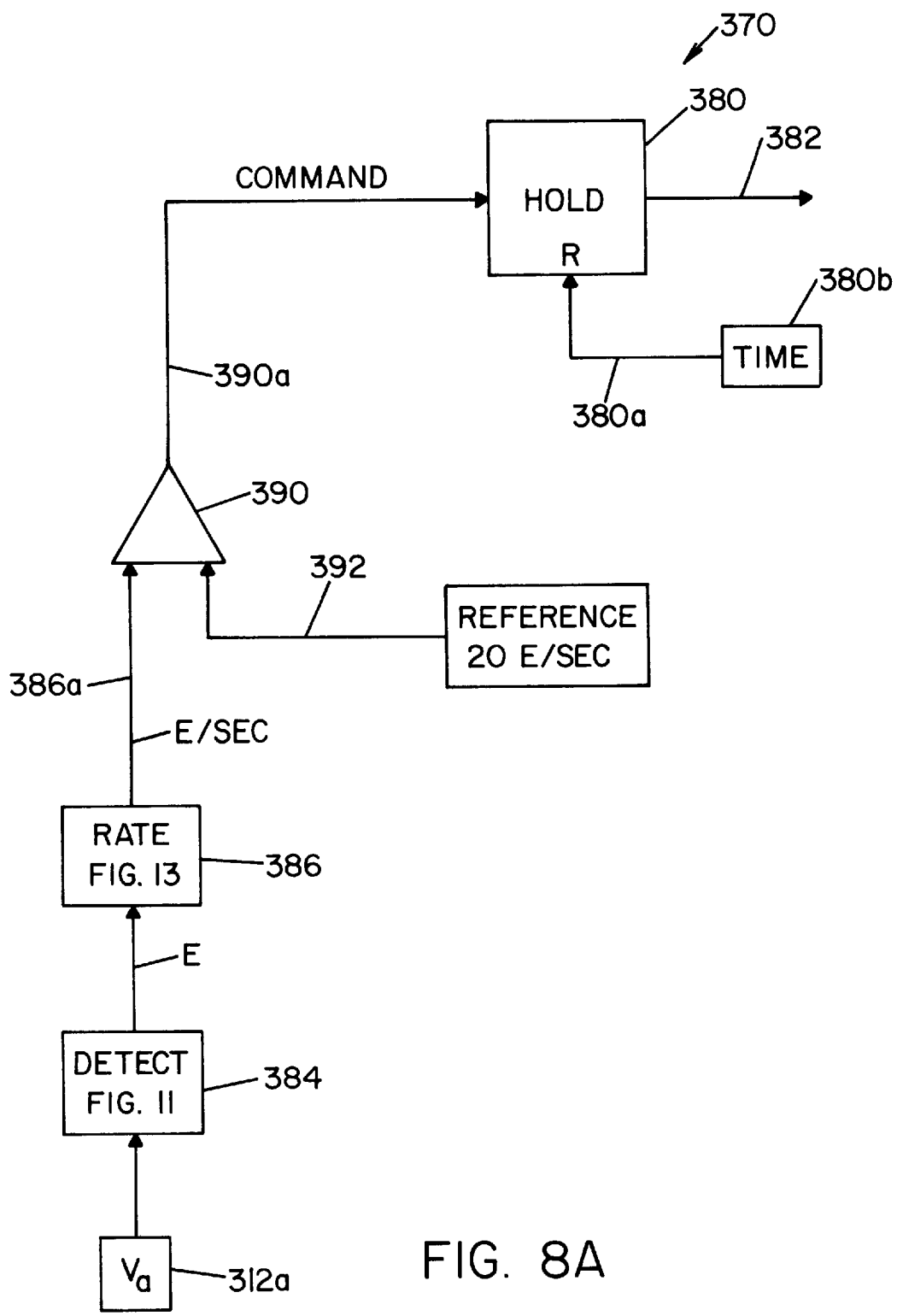
FIG. 8A is a schematic block diagram illustrating an implementation of the invention where the update is periodic at a controlled time which is greater than normal processing time of a microprocessor.

The invention is used to control a welding process to have an output level that maintains the rate of spatter events at a selected rate, preferably about 20 spatter events per second. This control is preferably adaptive as will be explained in connection with the lower system of controller 300 in FIG. 8. However, a weld process does not change appreciably in a time of less than about 10–60 seconds. Thus, a weld cycle can be started at its past control voltage, current, pulse size or rate, etc., and then update periodically. The control 370 in FIG. 8A is used for a periodic controller implementing the present invention. A sample and hold circuit or subroutine 380 has a set point or corrective control command on line 382, like control command 356. The spatter events in the filtered raw arc voltage $V_a$ in line 312a are detected by detector 384 and the rate of events is determined by rate calculated circuit or subroutine 386 with the actual spatter event rate appearing on line 386a. This rate is compared by comparator 390 with the desired rate on line 392 to give an error signal or corrective control command on line 390a. This command is voltage, current, pulse size or rate, etc., and is periodically stored in sample and hold circuit 380 which is reset by a pulse or signal on reset line 380a from a timer circuit or subroutine 380b. The time could reset the sample and hold at the start of a given weld cycle and then periodically update the set point command in line 382.

Controller 300 is preferably operated to maintain the rate of spatter events at a desired rate on an adaptive real time basis. This is accomplished by controlling the arc voltage or other set point or output of the power supply for welder 310 by spatter event control 400. This control arrangement in place of the previously described arrangement wherein the spatter voltage or other parameter is periodically determined and then used for a short time as a closed loop feedback to control the welding process of welder 310. By using adaptive spatter event control 400, spatter events E on line 340 are communicated on line 402 to calculation stage 412. In this stage, clock 414 is used to create a rate of spatter events at any given time during operation of welder 310. The rate of spatter events is compared to a set rate of spatter events entered into block 420 having output line 422. An error signal in line 412a indicates the deviation of the actual rate of spatter events to the desired rate of spatter events. A control device or routine 430, shown as a voltage control, adjusts the set point control 360 to maintain the rate of spatter events at a selected number in the range of 10–30 spatter events per second and preferably at 20 spatter events per second.

Controller 300 has two modes of operation. One mode of operation periodically determines the spatter voltage or other parameter, as shown at the upper portion of FIG. 8 and in FIG. 8A, and maintains the determined spatter voltage as the arc voltage of welder 310. This is merely 373 an approximation of the invention and can be used by determining the spatter voltage or other parameter at each cycle of a weld process or periodically. This aspect of the invention assumes no changes in the S curve during the short time between update of the set point of the power supply.

In accordance with the preferred implementation of the present invention, welder 310 is controlled by the adaptive spatter event control 400 so that the welder has an arc voltage or other parameter adjusted to maintain a desired rate of spatter events. In practice, the error or corrective control command signal on line 412a has a certain hysterersis, especially when the rate of spatter events is lower than the selected rate of spatter events. This area is less critical than when the spatter events per second is greater than the selected rate such as 20 events per second. The later condition is on the more vertical slope of the S curve 100.

The flow chart or block diagram in FIG. 8 is to illustrate the procedure for controlling welder 310 using the present invention, either at the "spatter voltage" or other set point as determined by the present invention or at a particular value for the rate of spatter events also in accordance with the present invention. The two embodiments of the present invention, periodic update or adaptive control, are disclosed schematically. Each system can be operated separated and can be performed by various control devices such as hard-wired circuitry, microprocessors, computers or PID controls. In practice, a microprocessor performs the steps discussed with respect to the diagram shown in FIG. 8 and FIG. 8A.

Figure 9:
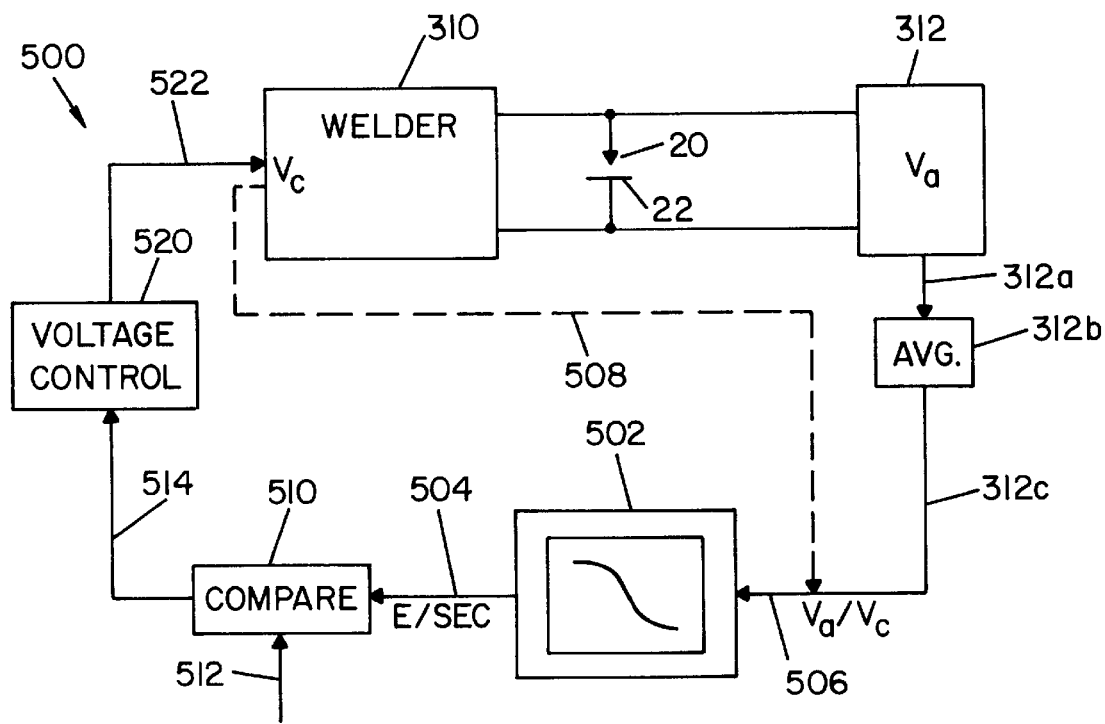
FIG. 9 is a schematic block diagram illustrating a further implementation of the present invention.

The preferred method used in practicing the invention is explained in the flow chart or diagram of FIG. 8; however, FIG. 9 discloses another way of using the data of curve 100 as shown in FIG. 4. A new curve is created for each D.C. welding process by adjusting the arc voltage and determining the number of spatter events per second at that voltage. This is done in the preferred embodiment as explained in connection with FIG. 8 by reducing the arc voltage incrementally in small steps such as 0.2 volts per second and then having the computer measure the spatter events. This detection procedure can be performed in a variety of programs which do not form a part of the invention but can be set to the negative spike identification scheme, i.e. negative spikes greater than 1–2 volts, negative spikes in the range of 1–6 volts, etc. Creation of voltage traces and detecting deviations in the arc voltage traces are common both by analog and digitally.

In control 500 shown in FIG. 9, S curve 100 for a particular voltage control welding is generated and recorded in an appropriate function generator 502, which could be a PROM with a digital output 504 controlled by the voltage level on analog input 506. The input is the average arc voltage in line 312c as indicated in the embodiment of the invention shown in FIG. 8 or the actual set arc voltage of welder 310 on read input 508. The voltage signal on line 312 is averaged by voltage averaging network 312b to give a fixed voltage level without noise or events. Digital information or data in line 504 is the spatter events per second for the voltage on input 506 either measured at the averaged arc voltage on line 312c or the voltage setting of the welder appearing on dashed line 508. This digital output word is compared with a reference value 512, which in practice is set at 20 spatter events per second. A digital word representing an error is transmitted to line 514 and is directed to the voltage control 520, similar to the voltage control 360 in FIG. 8. Output 522 adjusts the voltage of the welder to correct the error in line 514. The implementation of the invention shown in FIG. 9 uses controller 500 similar to the first implementation of the invention illustrated in FIG. 8. The difference is that the S curve has been constructed in advance and used in a PROM or other function generator to create a rate of spatter events for a particular voltage being implemented by the welder. In FIG. 9 function generator or PROM 502 is fixed for the operation of the welder. This process is not a preferred use of the present invention and merely approximates the constant spatter voltage concept of the present invention. The microprocessor will produce the S curve for each weld cycle and load the curve into PROM 502 for the specific weld cycle.

Figure 10:
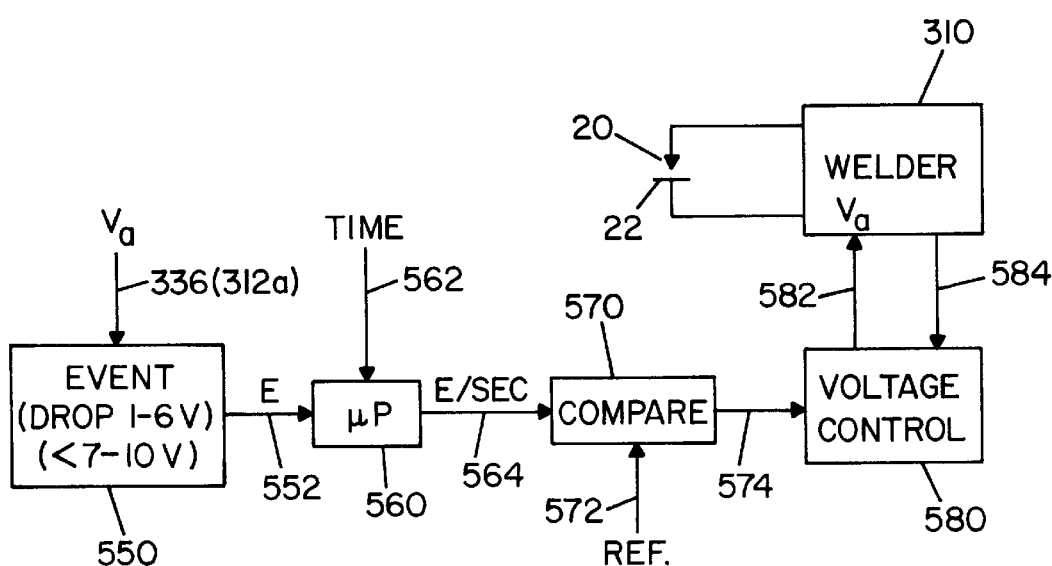
FIG. 10 is a schematic block diagram showing still a further implementation of the preferred embodiment of the present invention.
Figure 31:
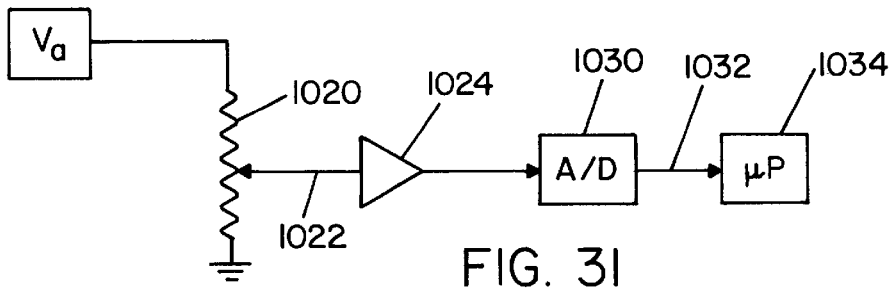

In FIG. 10, the raw arc voltage appearing in line 336 or 312a in FIG. 8 and in FIG. 9 is directed to a software program 550 for measuring negative spikes or deviations in a set range preferably 1 to 6–10 volts, but greater than 7–10 volts. As shown in FIG. 31, the arc voltage is preferably digitized before processing. Each of these spikes or deviations, are detected and transmitted as a digital pulse in line 552 forming the input of a microprocessor section 560. Program 550 is executed in the same microprocessor. An appropriate time signal or internal clock 562 of the microprocessor allows the microprocessor to produce a digital output on line 564 which is the actual rate of spatter events, in events per second. This actual rate is compared by comparator 570 with a selected rate at input 572, which in practice is 20 spatter events per second. The error in line 574 is used by control device or controller 580 to adjust the arc voltage of welder 310 through line 582. A signal representing the actual voltage to controller 580 appears on line 584. This implementation of the invention measures the rate of spatter events and compares the measured rate with the desired rate to control the arc voltage of the welder.

Figure 11:
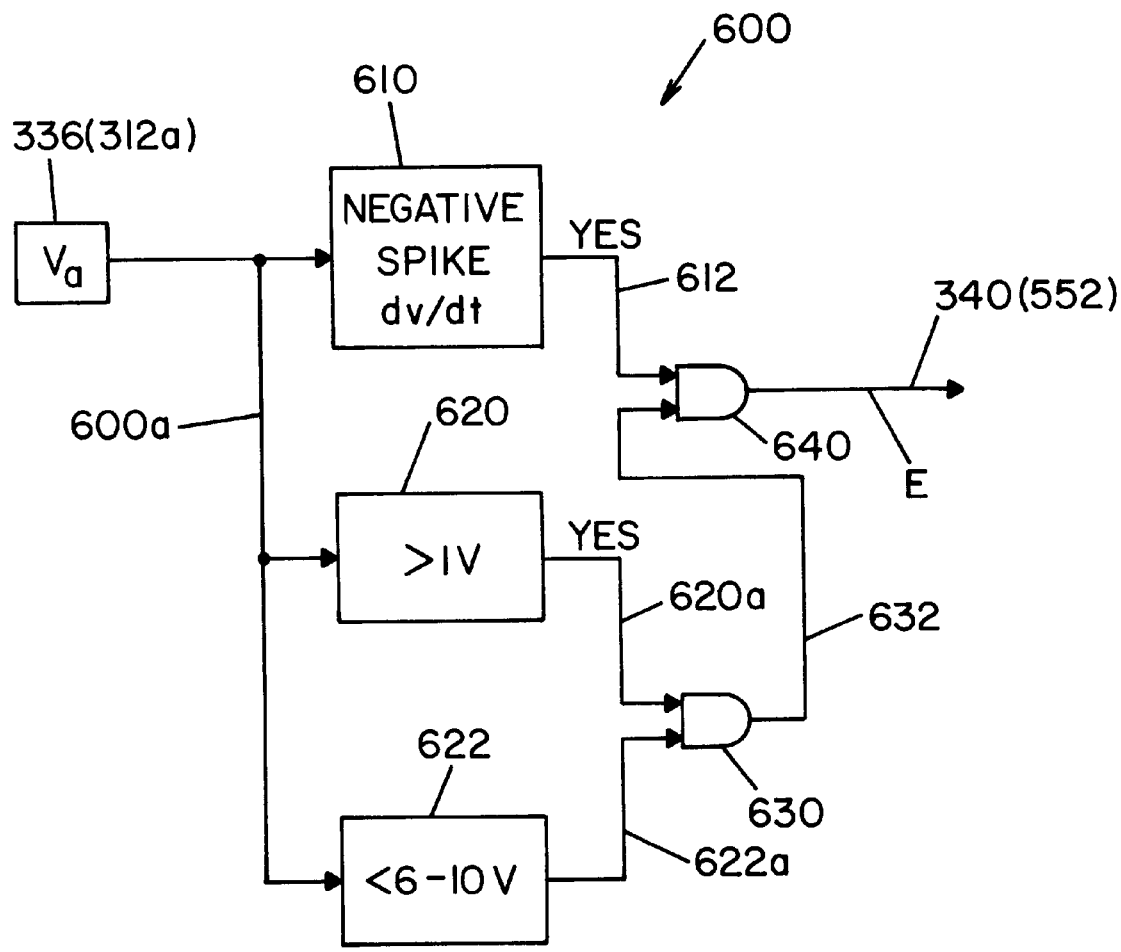
FIG. 11 is a schematic block diagram showing a software procedure to be used by the microprocessor for detecting spatter events.
Figure 11A:
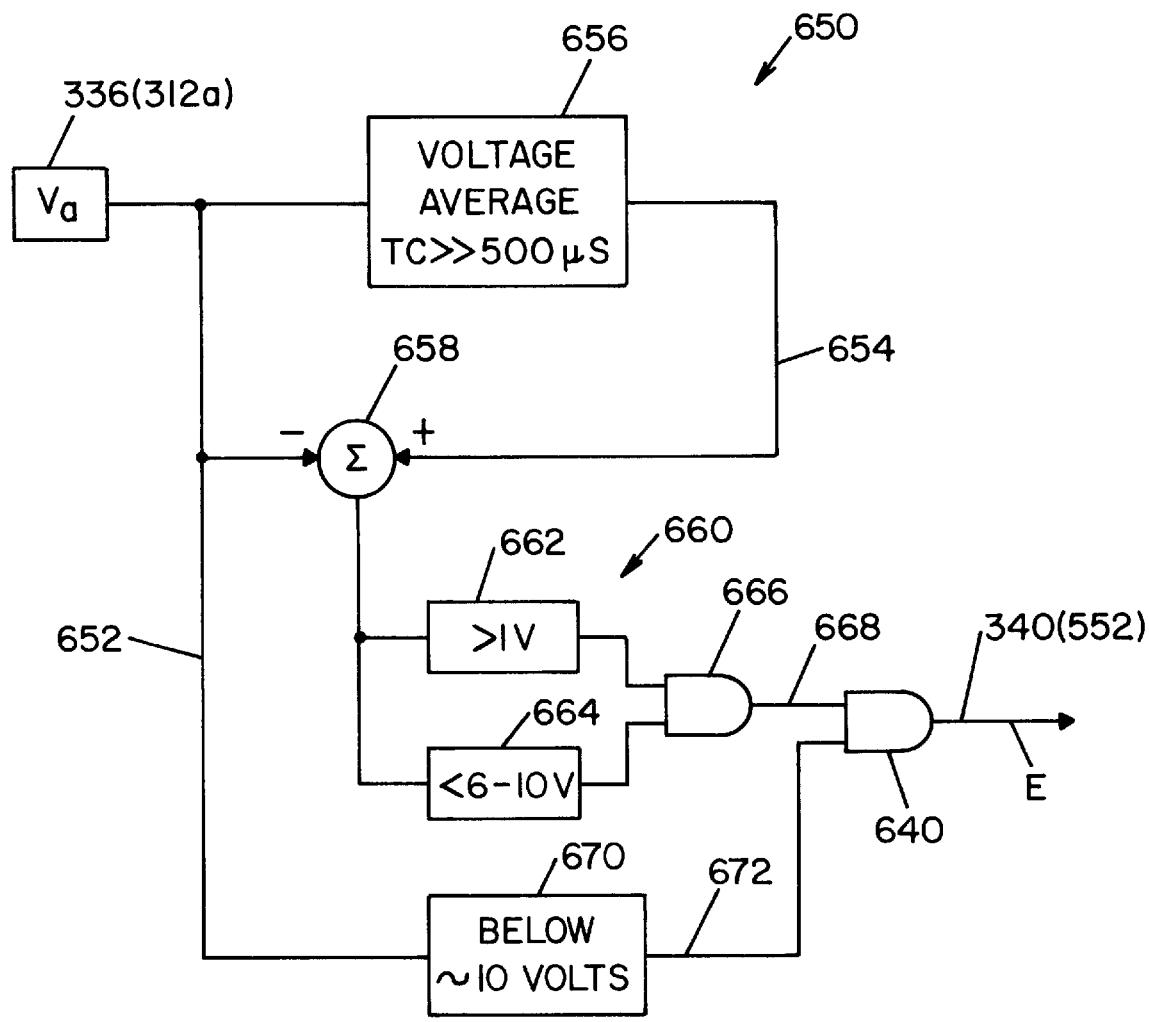
FIG. 11A is a schematic block diagram showing another software procedure to be used by the microprocessor for detecting spatter events.

The event detector circuits or programs 338 and 550 detect negative spikes in the arc voltage. In one aspect of the invention, spatter events are spikes which have a relatively low magnitude to distinguish them from actual short circuit transfer spikes. Shorts plunge to near zero volts and stay below 7–10 volts until the short is broken. This time is generally greater than $500\mu$ sec. To distinguish the spikes from globular transfer shorting, the spikes must be greater than 7–10 volts above zero, i.e. the short circuit voltage. A variety of software programs are available for detecting such negative spikes. A representative type of programs are schematically illustrated in FIGS. 11 and 11A. In FIG. 11, the raw arc voltage in lines 312a or 336 is directed to the circuit or program 600 for determining events E. Such a program includes routine or circuit 610 to detect a negative spike. This circuit is a dv/dt detector that produces a positive output or affirmative answer in output line 612 when a negative spike is detected. At the same time, the signal in line 600a is directed to a level detector including a minimum threshold circuit or program 620 and a maximum threshold circuit or program 622 having outputs represented as lines 620a, 622a, respectively. The maximum threshold is set at 6–10 volts. The measuring equipment and the clarity of event E controls the maximum. As will be explained later, the event can be any negative spike above 1–2 volts at a low rate below 30. These outputs are both a logic 1 when the negative spike is within a preselected negative plunge, indicated to be a drop between 1 and 6 volts D.C. Of course, these values can be adjusted so long as they distinguish between spatter events and the negative spikes associated with globular transfer, instantaneous shorts or actual shorts. Short circuits have a width of at least 50015 see and plunge to about zero. These are not detected as spatter events as shown in FIG. 11A although they are detected as spatter events in other detector arrangements. Gate 630 detects when a spatter event has occurred. This fact, with the fact that there has been a negative spike, as represented by the output in line 612, controls gate 640. Gate 640 produces a digital signal in lines 340 or 552 to indicate that an event has been detected.

Spatter events in the narrowest sense can be detected by many techniques, such as shown in FIG. 11. The event is a negative plunge of about 1 to 6–10 volts. If the negative plunge detected by the dv/dt circuit of FIG. 11 is greater than about 6–7 volts, then the spike is considered a short circuit. This concept is satisfactory; however, an alternative program or subroutine 650 for detecting spatter events while removing deep spikes only when such deep spikes are actually short circuits and plunge to below about 10 volts. This is shown in FIG. 11A. Program 650 senses the raw output voltage at line 312a or line 336 to give a raw voltage signal on line 652 and an average voltage signal in line 654 at the output of averaging network 656. Network 656 has a time constant substantially greater than $500\mu$ sec. The average voltage in line 654 is added to the raw voltage signal in line 652 by summing junction 658. The detected negative spikes are passed through a threshold detector 660 set at 1 volt at stage 662 and 6–10 volts at stage 664 controlling output gate 666. A negative spike greater than 1 volt and less than 6 volts gives a logic 1 at output 668 of network 660. This output signal is the first input to gate 640 shown in FIGS. 11 and 11A. The other input to gate 640 is output 672 of short detector 670 looking at the raw voltage on line 652. If the negative dip or plunge is to a level below about 10 volts, a short is detected to give a logic 0 in output 672. This blocks gate 640 by indicating that the negative spike is actually a short. Thus, the output of program 650 is a spatter event E for use in practicing the present invention. Detectors in FIGS. 11 and 11A look at the raw voltage trace which may have small spikes because of limitation of sensitivity or calibration. If the small spikes in FIG. 3 are really instantaneous shorts it is irrelevant to the invention.

The basic invention involves determining the set arc voltage of the welder which will result in a particular rate of spatter events for a particular D.C. arc welding process. This is accomplished by merely detecting the spatter events, determining the rate of spatter events and then adjusting the welder to have a preselected rate of spatter events. The invention is used in various ways to control D.C. arc welding by using the rate of spatter events as the controlling parameter instead of merely voltage and/or current. Of course, voltage control can be used when the spatter voltage has been determined for a particular short welding cycle which does not change. This is not considered a constant voltage control arrangement, but a control arrangement which maintains the voltage at the spatter voltage and is referred to as the "constant spatter voltage" mode.

Figure 12:
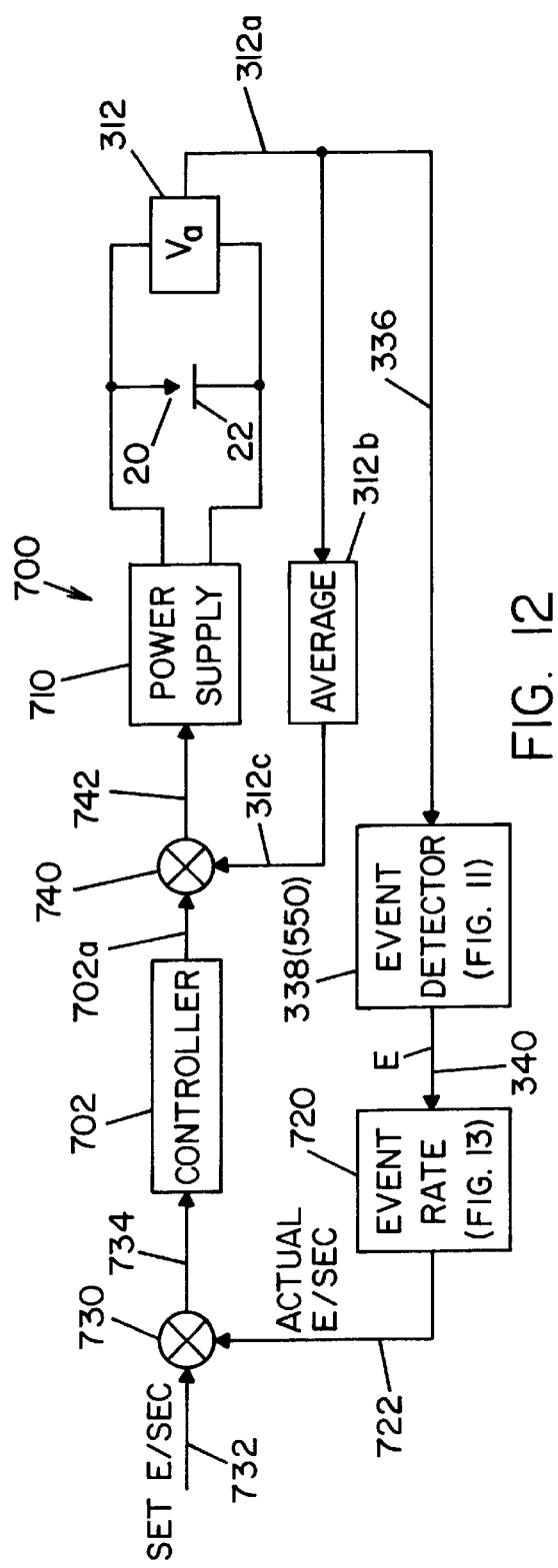
FIG. 12 is a schematic block diagram of the preferred method and controller for practicing the present invention.

The preferred embodiment of the present invention is illustrated in FIG. 12 wherein control system and method 700 includes a controller 702 for controlling the arc voltage of welder 710. Event detector 338 (550) best illustrated in FIGS. 11, 11A, 29 and 29A takes the raw arc voltage in line 336, which is also line 312a, to produce an event signal E in line 340 each time there is a detected spatter event or negative spike constituting a spatter event. An event rate circuit or subroutine 720 best shown in FIG. 13 creates an actual rate of spatter events in line 722 as spatter events per second. This actual rate is directed to one input of an error junction or amplifier 730 which is also receiving the set or selected rate as indicated by input line 732. This rate is adjusted to a desired rate such as approximately 20 spatter events per second. Junction 730 creates an error output in line 734 to control the voltage of the welder by controller 702 having an output 702a. This output is one input to error junction 740. The other input is the average arc voltage in line 312c. The output of error junction 740 is line 742 that controls the arc voltage of the power supply or welder 710. By using system or method 700, the power supply of the welder is maintained at an arc voltage having the set or selected rate of spatter events inputted on line 732. The closed loop control of the arc voltage is by the rate of spatter events. This is novel in the welding art and produces the results not obtainable by a standard constant voltage operated D.C. welder.

Figure 13:
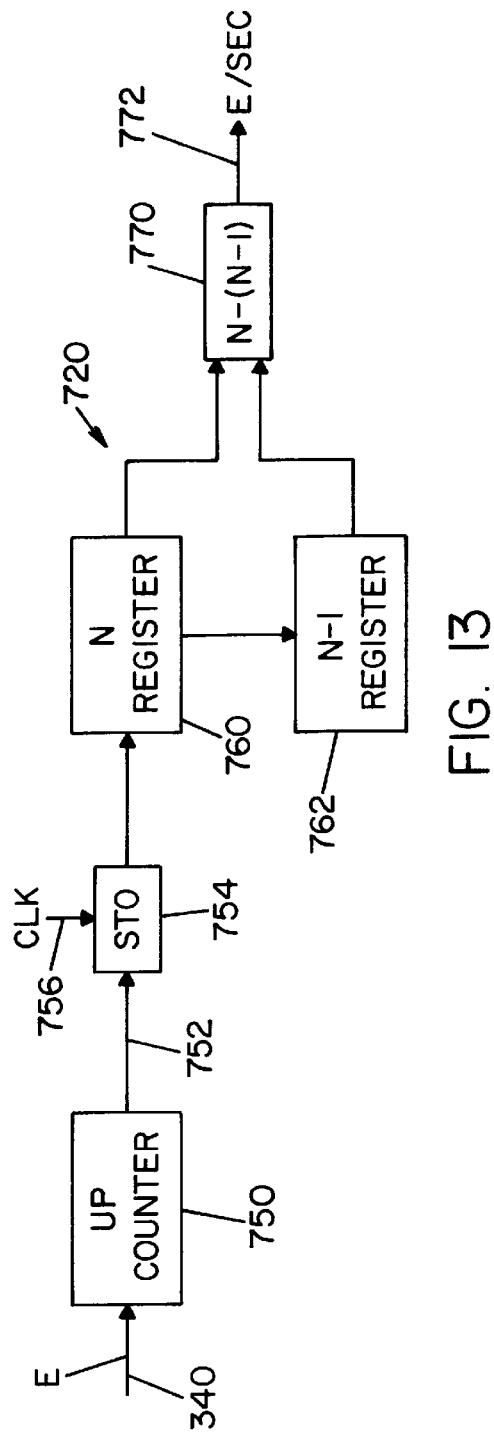
FIG. 13 is a schematic block diagram of the software program for determining the rate of spatter events in a total weld process for use in the present invention.

As mentioned in FIG. 12, the rate of the spatter events is determined by the circuit or routine 720 which circuit or software routine is shown in FIG. 13. The rate of spatter events as measured by circuit or program 720 includes an up counter 750 receiving counting pulses or event signals E in line 340. These events E are counted and the total appears in line 752. The total count is stored in register 754 upon receipt of a clock pulse in line 756. The stored count is transferred to a current register 760 that forces the previous count into a preceding count register 762. By subtracting the count in register 762 from the count in register 760, using a subtract program or software routine 770, the count difference appears as a rate in line 722. This rate is the actual rate of spatter events to be compared with the selected rate as discussed in the previous systems and methods.

Figure 14A:
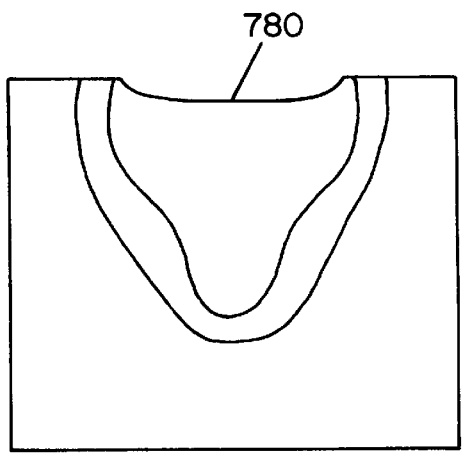
FIGS. 14A–C are cross sectional views showing the weld bead for different depths of the test groove and different stick out using a constant voltage process.
Figure 15A:
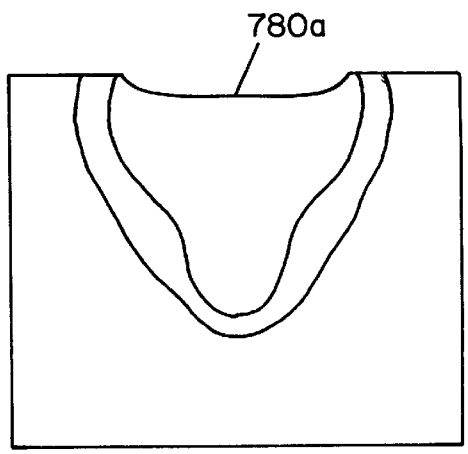
FIGS. 15A–C are similar to FIGS. 14A–C illustrating the same weld process using the present invention.
Figure 14B:
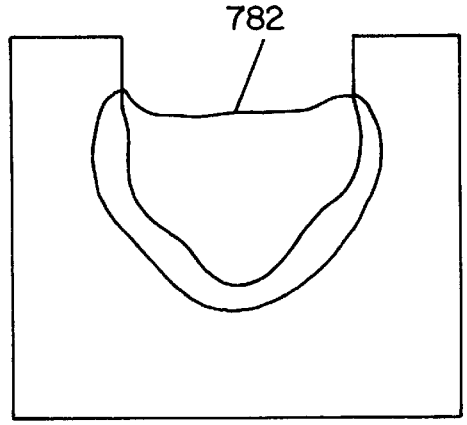
Figure 15B:
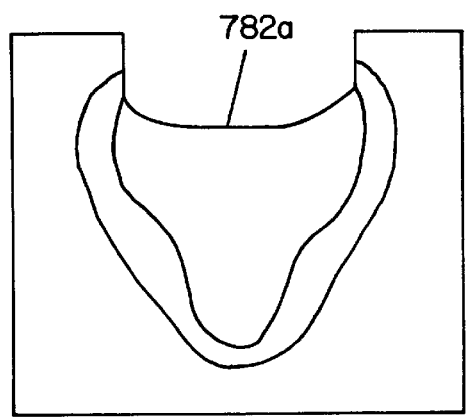
Figure 14C:
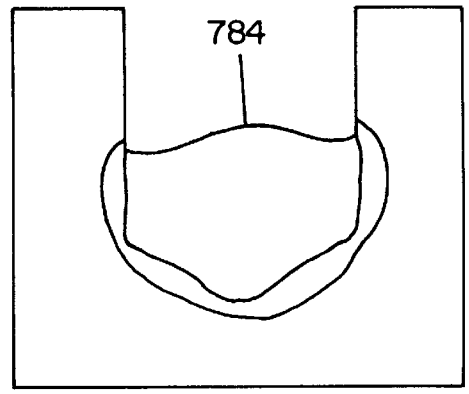
Figure 15C:
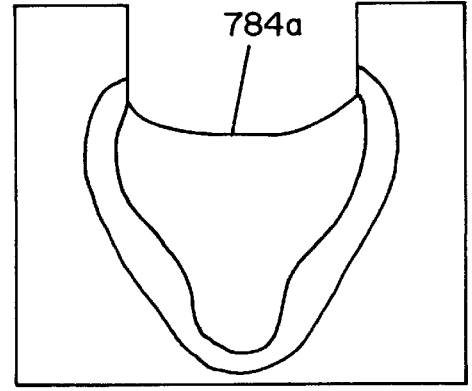

To show the advantage of the present invention as compared to a standard constant voltage welding process, FIGS. 14A–14C (constant voltage) and FIGS. 15A–15C (constant spatter voltage) show weld beads using a L50 electrode sold by The Lincoln Electric Company with a diameter of 0.045 inches with a wire feed speed of 400 inches per minute and a deposition travel speed of 12 inches per minute. FIGS. 14A and 15A had a groove depth of 0.098 inches with an electrical stickout of 0.6821 inches. Beads 780 and 780a show a slight raise or hump in the constant voltage example of FIG. 14A. The bead 780a is generally convex in the constant spatter control bead shown in FIG. 15A. In FIGS. 14B and 15B, the groove depth was increased to 0.193 and the stickout was 0.7767. The bead 782 formed by a constant voltage welding procedure has the distinct convex top, which is not created in the bead 782a created by a process of the present invention, which is referred to as "constant spatter voltage" control. As a third comparison, the groove was increased to 0.282 inches with a stickout of 0.8661 inches for the examples shown in FIGS. 14C, 15C. In these examples, the difference between the resulting weld bead using the present invention (FIG. 15C) and using a constant voltage mode of operation (FIG. 14C) is pronounced. The same comparison has been found in using welding wires of various shapes and construction. By using the present invention and controlling the arc voltage to a particular number of events per second a consistently high quality weld bead is obtained. The top is flat to concave and penetration is deep. As shown in FIGS. 14A–C and FIGS. 15A–C as electrical stickout increases for constant voltage welding the weld contour changes to create stress rising lumps and undercuts. However, as the stickout increases for constant spatter voltage, in accordance with the present invention, the welds exhibit the same concave contour, weld substrate contact angle, heat affected zone and penetration. In addition, the slag on all welds was centered along the center of the bead. Only a small amount of dust and no spatter was on the surface of the welds using the present invention. By using a constant spatter voltage welding procedure of the present invention, it was found that the result of the procedure was independent of electrical stickout.

Figure 16:
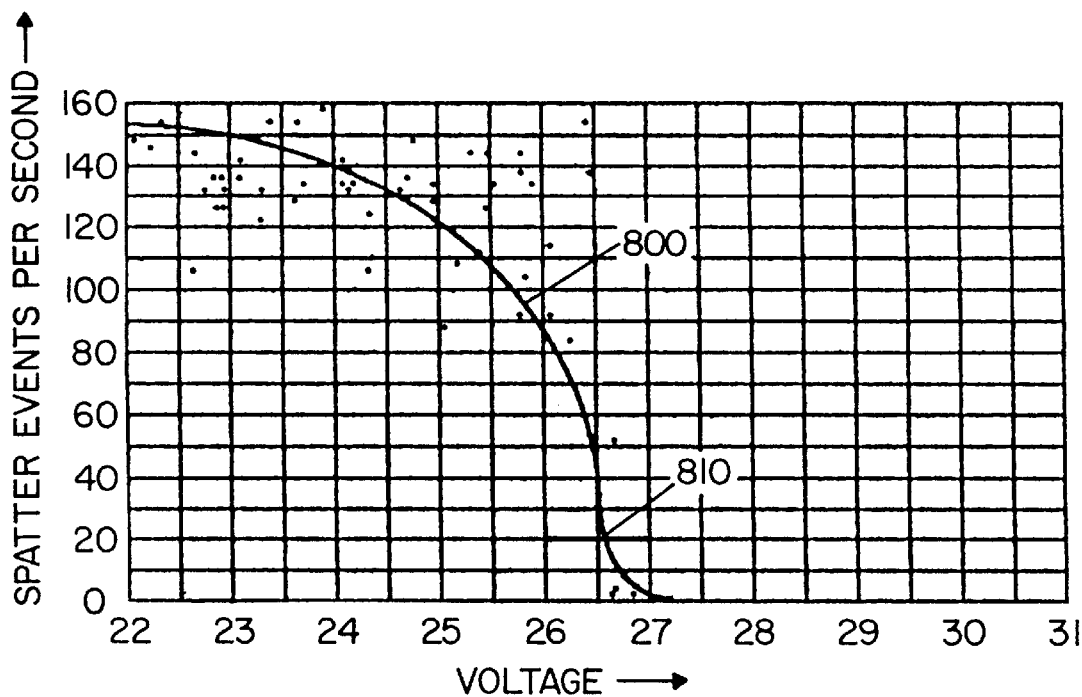
FIGS. 16–19 are S curves for welding processes using different shielding gases.
Figure 17:
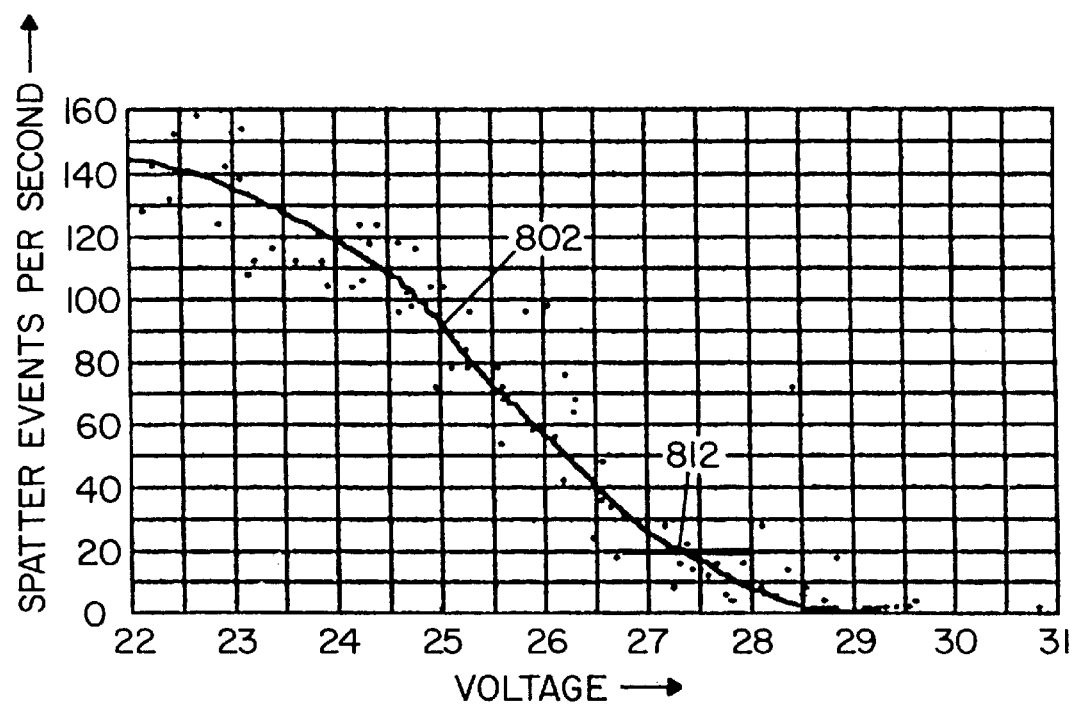
Figure 18:
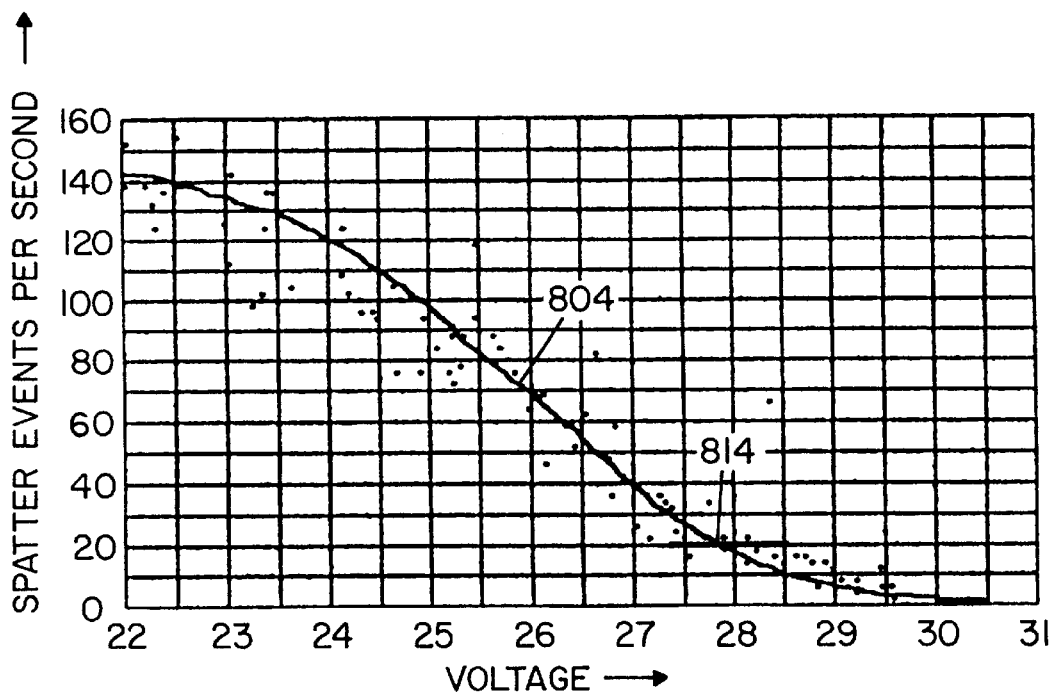
Figure 19:
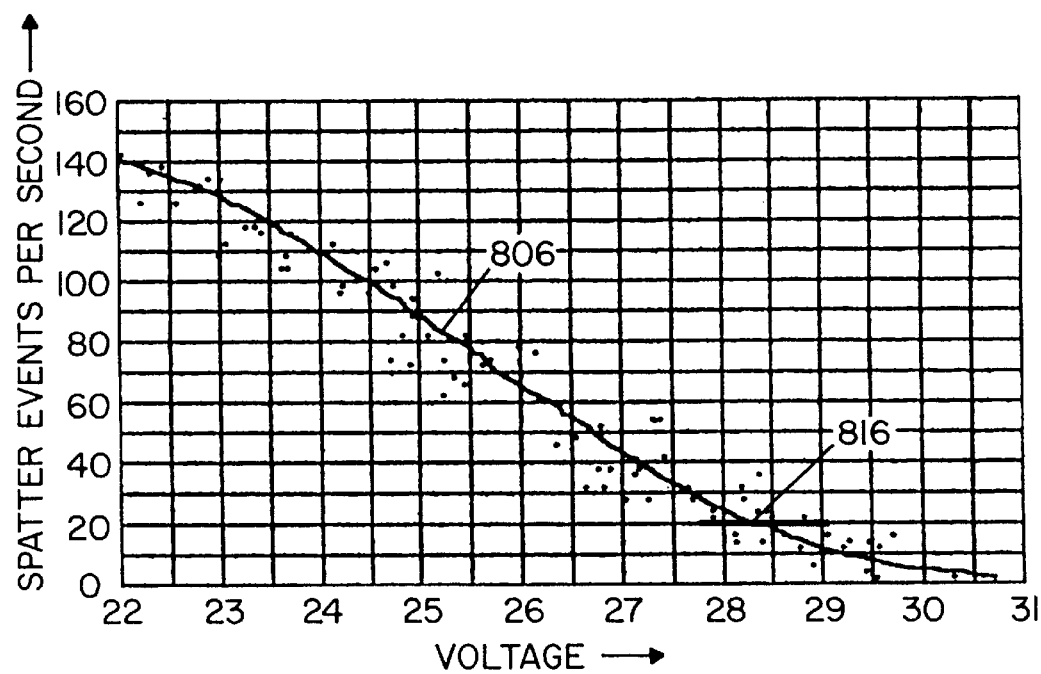

As another advantage of the present invention, it was also found that the quality of the weld does not change as the composition of the shielding gas is modified. To reveal this advantage, voltage controlled welds were created using a variety of shielding gases. By incrementally a decreasing the arc voltage, the S curves 800–806 shown in FIGS. 16–19, respectively were created. These S curves identified the spatter voltage for a selected spatter event rate of 20 events per second as changing. With 5% carbon dioxide as shown in FIG. 16, the spatter voltage 810 was 26.5 volts D.C. By increasing the carbon dioxide to 10%, the spatter voltage 812 in FIG. 17 was increased to 27.5 volts D.C. In FIG. 18, the spatter voltage 814 was 28 volts D.C. when using 15% carbon dioxide. In a last example shown in FIG. 19, the shielding gas was 20% carbon dioxide and the spatter voltage was 28.5 volts D.C. In all of these examples, the spatter voltage changed with the composition of the shielding gas. However, the ultimate welding practice using the present invention at the various spatter voltages were consistent, uniform and duplicative. The actual cross-sections of the weld using the present invention with the different shielding gases are shown in FIGS. 21–24 corresponding to the shielding gases of FIGS. 16–19, respectively. The beads 822, 824, 826 and 828 are all generally flat or slightly convexed at tops 822a, 824a, 826a and 828a and deep penetration 822b, 824b; 826b and 828b. Thus, changes in shielding gas have no perceived effect on the weld when using the present invention.

Figure 20:
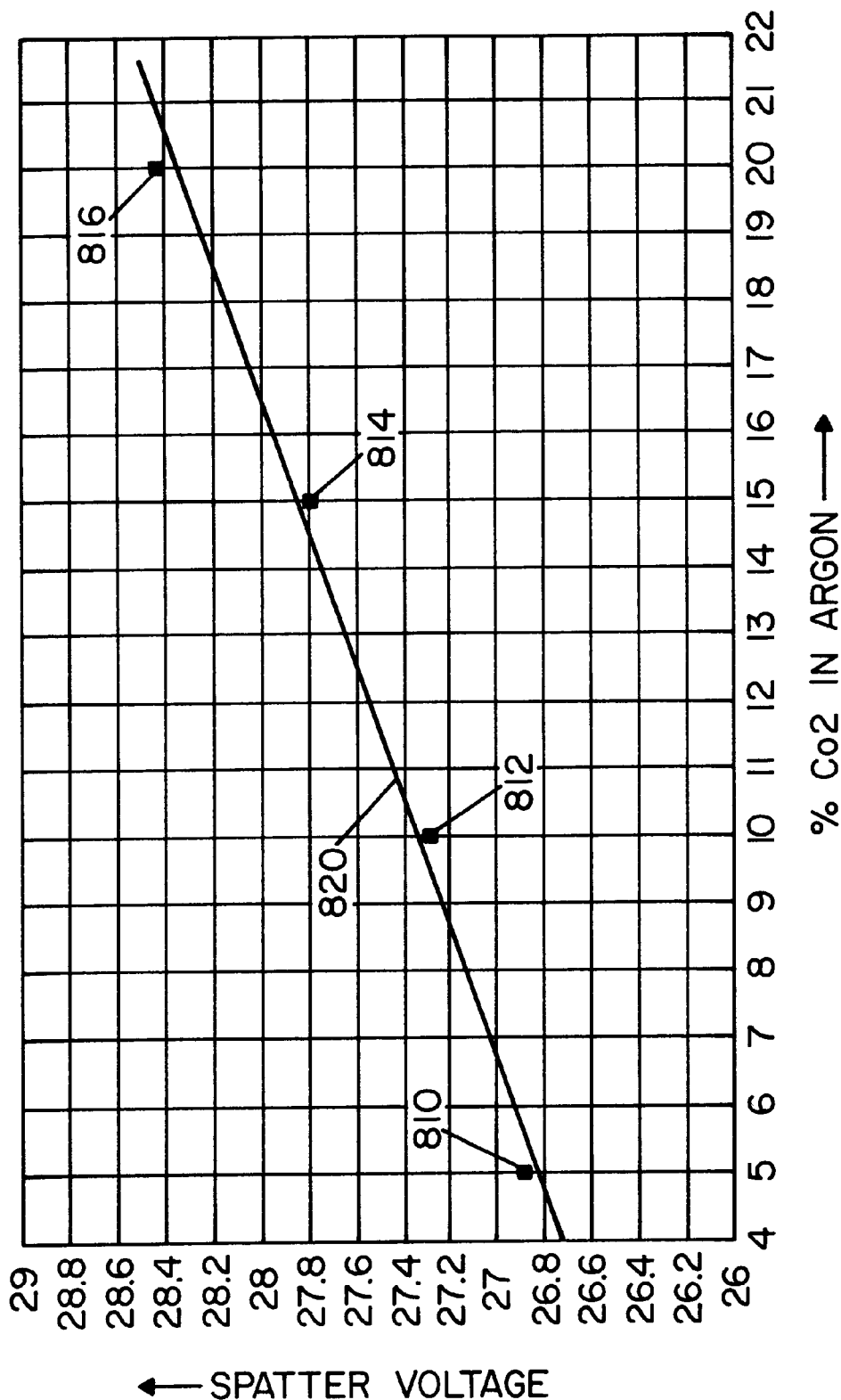
FIG. 20 is a graph of the spatter voltages for different shielding gases obtained from FIGS. 16–19.
Figure 21:
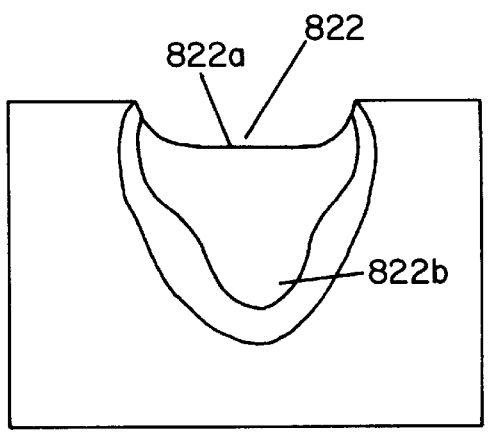
FIGS. 21–24 are cross sectional views showing the weld beads using the shielding gases of FIGS. 16–19, respectively, and using the present invention.
Figure 22:
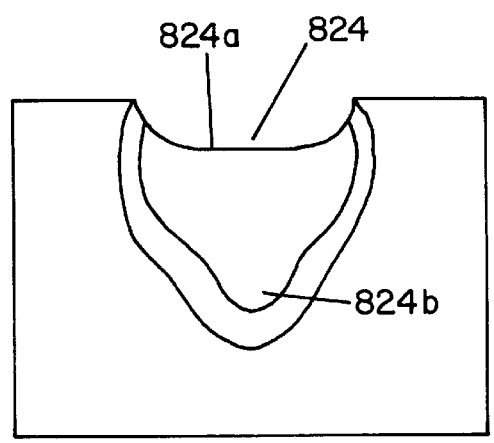
Figure 23:
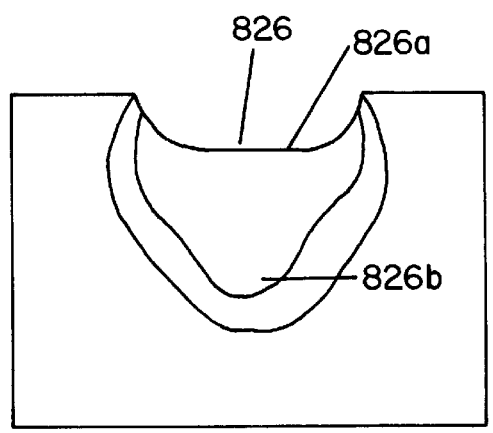
Figure 24:
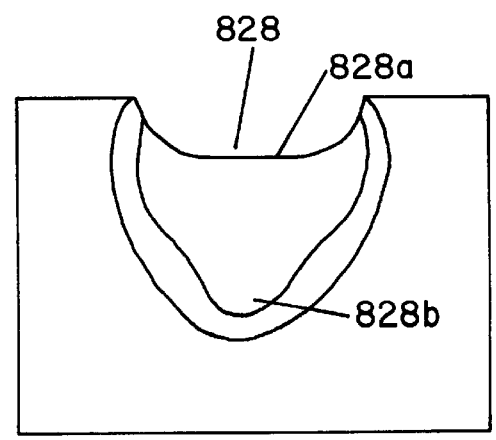

Curve 820 in FIG. 20 is a curve matching spatter voltages 812–816 and shows that the spatter voltage for various shielding gases changes automatically when using the present invention to control the arc voltage of the welding process. This is just another example of a parameter which changes the spatter voltage and, thus, the arc voltage for controlling the constant spatter voltage process so that the end result is a uniform weld irrespective of changes in the gas composition stickout and other parameters. This presents an extremely advantageous control arrangement for D.C. arc welding so that the weld remains consistent irrespective of changes in the wire, changes in a the gas composition, changes in stickout, etc. No other process has been developed for accomplishing this objective. The same consistency and advantages have been found when using the present invention to control the output of other arc welding processes, such as pulse welding.

The present invention relates to the concept of controlling an arc welder by using the rate of spatter events which occur in various types of arc welding, including processes controlled by voltage, current and pulses. Further, the general purpose implementation of the present invention is illustrated in FIGS. 25–26 where similar components and circuits or software programs bear the same numbers. These three control systems or controllers, and the method of using the same, are disclosed for the purpose of including additional features of the invention and explanatory material to illustrate the tremendous universality of the invention. FIG. 25 shows a controller system 900. A "controller system" and "controller" are terms used interchangeably to describe the invention which relates to controlling an output parameter of an arc welding process to maintain the rate of spatter events at a specific value. Controller system 900 accomplishes this objective by using a parameter control device or controller 902 for power supply 904 providing D.C. power to the welding process across electrode 20 and workpiece 22, which welding process has a voltage detector 312 to provide raw voltage in line 312a for the purposes of detecting spatter events. Since the controller may control the output of power supply 904 by controlling current, voltage or pulses, control 902 is illustrated as having an arc current input in line 904a obtained from shunt 904b in the output circuit of the welder. The raw arc voltage in line 312a is processed by event detector 906, as illustrated in FIGS. 11, 11A, 29 and 29A to detect spatter events (in the narrow sense or broad sense, which events are processed by the event rate circuit or subroutine 908, as best illustrated by FIG. 13. This provides a spatter event rate at the input of comparator 910 to compare the spatter event rate of the welding process with a selected spatter rate indicated as block 912 and appearing on line 912a. A corrective control command signal is best generated in line 910a and this signal is used by controller 902 to adjust the output of power supply 904 by the value of the command signal in line 914. Controller 900 and the method of using this controller maintains the output of the D.C. welder at a level either current, voltage or pulse shapes or rate to give the desired rate of spatter events on an adaptive basis.

In some instances the optimum rate of spatter events is different based upon variations in a parameter. When travel speed of the wire is increased the voltage to maintain the desired weld is higher so the rate of events E to be used as the set point is decreased. This change in the rate set point based upon changes in a given parameter is accomplished adaptively by an addition to the controller as shown in FIG. 25A. Sensor 916 detects a parameter to give a representative signal in line 916a which signal is compared to a reference signal in line 916b by an error amplifier 918. The word or voltage level in line 918a changes the setting of the selected rate in block 912. Sensor 916 could be an analog device or a digital device such as a look-up table in a program or PROM if the process is digital. Manual adjustment of sensor 916 for different parameters can replace the normal control of the selected rate. This adaptive concept could be used in all embodiments of the invention.

A similar controller 920 is shown in FIG. 26. Power supply 922 has its output controlled by control device 924 shown as having a voltage input on line 924a and a current input on line 924b. The output of the welder is controlled by power supply 922 according to the command signal on line 910a at the output comparator 910. Controller 920 of FIG. 26 employs another aspect of the present invention. Control 924 is manually set to a desired output parameter, preferably voltage, by an input circuit indicated as function block 930 with an output 932 for initiating power supply 922 at a given starting level for the control parameter. The input from block 930, in accordance with another aspect of the invention, is a "remembered" parameter value or level, which "remembered" value is the value at the previous weld cycle, the previous shift or any next previous operation of controller 920. In this manner, controller 920 is initiated at the general output parameter found in the past to control the rate of spatter events or at a desired or selected rate on a historical basis. Control systems or controllers 900, 920 are preferably used to control arc voltage; however, the output parameter used during the welding process for adjusting the rate of spatter events to the desired rate varies with the mode of operation used by the arc welder. It has been found that the rate of spatter events in the general range of 10–30 spatter events per second is applicable to the common welding processes. It is conceivable that a different rate of spatter events could be selected for specialized arc welding processes by still employing the present invention, which invention is basically the concept of detecting spatter events, determining the rate of spatter events and then adjusting the output of a welder to have a consistent performance of the welding process irrespective of variations in the wire, qualities of the wire, the shielding gas, and other parameters controlling the quality of the resulting weld. An operation point of less than 10 spatter events per second is more difficult to regulate so the preferred aspect of the invention controls the welder at 10–30 events per second. In unique situations, a lower rate of spatter events is used as the operation point. This is especially applicable at high speeds of wire travel along the workpiece. Thus, the control point is at a selected rate less than 30 events per second in its broadest sense and in the range of 10–30 events per second in its more narrow sense. To compensate for fast speeds, the preferred use of 20 events per second is reduced to a set point in the range of 12–15 events per second. Thus, the preferred rate is a set point in the range of about 12–20 events per second.

Figure 27:
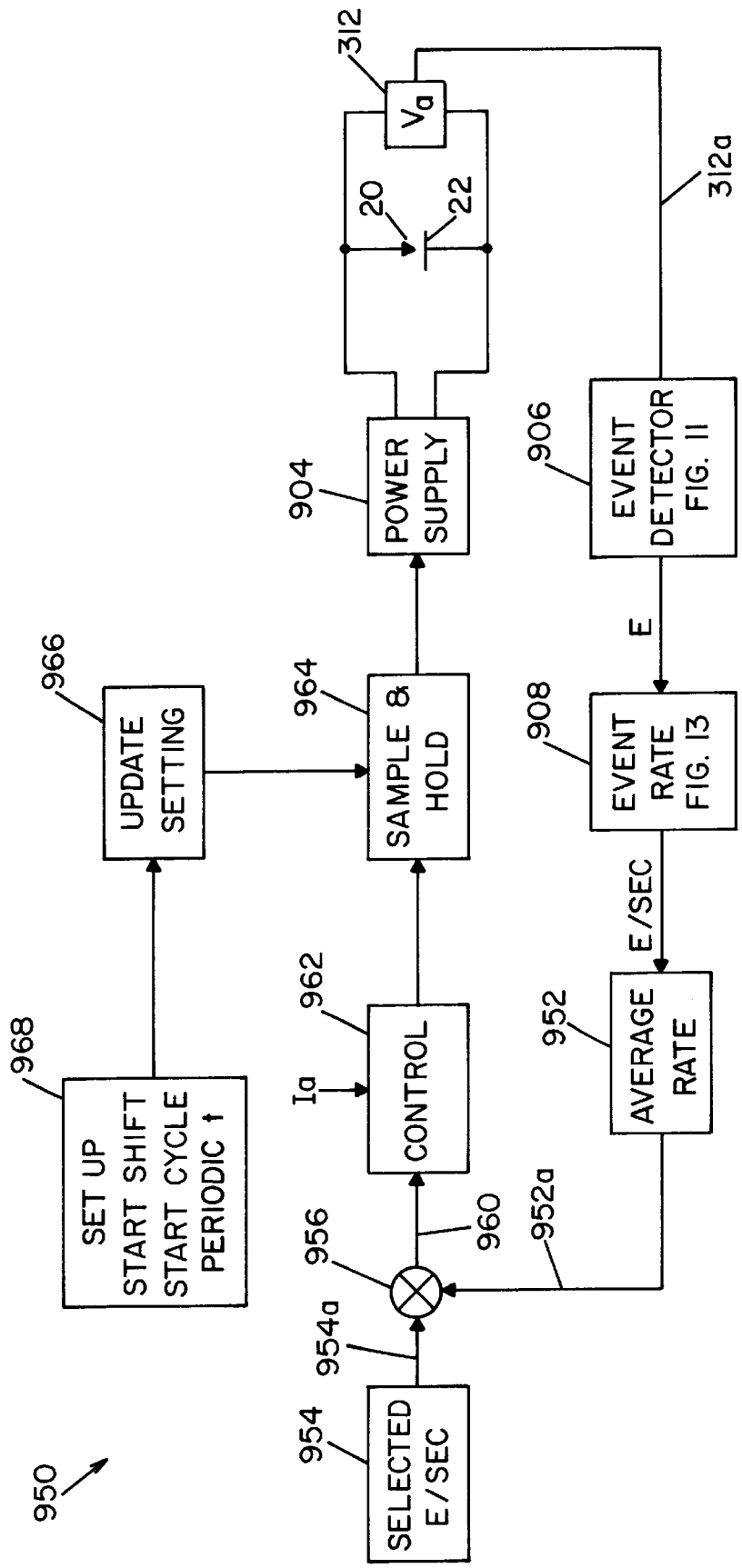
FIG. 27 is a schematic block diagram showing the periodic embodiment of the inventions for use in controlling various output levels of a welder.

Although the invention is particularly applicable for adaptive control of the output parameter to maintain the rate of spatter events, it has been found that the purely adaptive implementation of the invention is not necessary to obtain the benefit of controlling of the output parameter to a specific spatter event rate. For instance, if the output of the arc welder is adjusted periodically, at times less than about 1 minute, variations in the welding parameters that affect the quality of the weld usually do not change drastically during such a short time. Consequently, as an aspect of the invention, the output of the welder is periodically set at a parameter to control the desired rate of spatter events. Thereafter, the output parameter is maintained until the next adjustment in the output parameter. It has been found that since the parameters do not change rapidly, periodic setting of the arc welder accomplishes the objective of the present invention and is equivalent to an adaptive operation. In the adaptive operation, the response of the welder is generally considered instantaneous, although it is not actually instantaneous. This adaptive update period of time can be extended, but the process is still adaptive in nature, although it is only periodically adjusted. This aspect of the invention is illustrated in FIG. 27, wherein control system or controller 950 includes the elements of controller or control system 900 and control system 920 with the addition of a circuit or subroutine 952 for averaging the rate of spatter events. The average rate in line 552*a* is compared with the selected spatter event rate indicated by a block 954 and appearing in line 954*a*. By comparing the average spatter event rate with the desired spatter event rate at comparator 956, a command signal is created in line 960 and this signal is directed to controller 962. This command signal controls the output parameter used for maintaining the desired operation of the arc welding process. In accordance with the aspect of the present invention, where the adaptive procedure is periodically operated, a sample and hold network or device 964 accepts the command signal on line 960 and communicates this command signal to the power supply 904 upon receipt of a signal from the update setting device 966. This update setting device merely transfers the command signal, as a digital word, from control 962 to the input of the power supply as an analog signal to maintain the output parameter of the power supply at a level necessary for adjusting the spatter event rate. The output stage of sample and hold network 964 includes a digital to analog converter. In accordance with the illustrated embodiment of the invention, update setting 966 is controlled by an input 968 which causes the update to occur at a specific time. This time is indicated to be the setup time for the welder, the start time for the shift or the start of a given welding cycle. In addition, the update setting device 966 can be periodically pulsed by an oscillator set at a given time t which time, in practice, is less than 60 seconds. In this manner, periodically the welder is adjusted to the desired output parameter, preferably voltage, to maintain the desired rate of spatter events.

Figure 28:
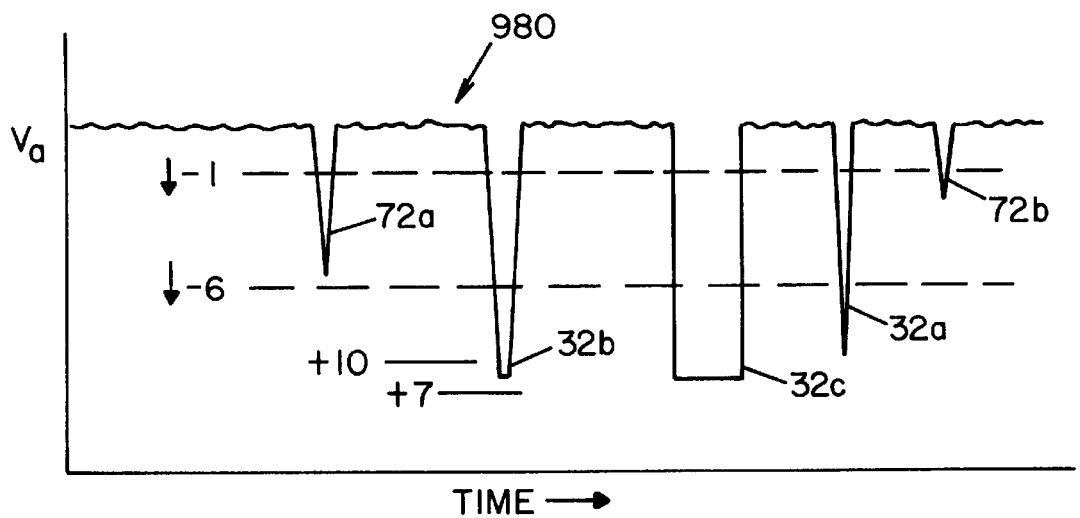
FIG. 28 is a trace of arc voltage when controlled according to the present invention showing possible sporadic shorts and other occasional disturbances.

The present invention involves measuring spatter events E. These events are the voltage spikes in the region of operation between spray transfer shown in FIGS. 1 and 1A and globular transfer shown in FIGS. 2 and 2A. In practice, the events E are detected and give a rate of spatter events which rate is used to control the welder at an output parameter giving a desired or selected rate. The selected rate is 10–30 events per second (preferably 20 events per second) and is schematically illustrated as the voltage trace 980 shown in FIG. 28. At this low rate, the preferred implementation detects only spatter events as short negative spikes, i.e. spikes 72*a* and 72*b*. It has been found that at this low rate, there may be a few globular spikes 32*a* and isolated incipient or instantaneous shorts 32*b* or actual shorts 32*c*. An instantaneous short 32*b* occurs when the wire momentarily touches the workpiece causing a rapid plunge toward zero volts, i.e. between 7–10 volts. Short 32*c* has a longer time at a low voltage (i.e. 7–10 volts) for actual metal transfer with an electrical pinch action. Trace 980 is found at 20 events per second; thus, it is not in the globular region where spikes 32*a* occur over 50–100 times a second or in the short circuit region where shorts 32*b* occur over about 150 times per second. When operated at 10–30 events per second, the shorts (actual or instantaneous) or globular disturbances are sporadic and only occasional. It has thus been found that the invention can detect the actual events forming the vast percentage of negative disturbances, as well as the occasional short or globular release. In the broadest sense, these are all spatter events used to practice the invention. The spatter event E is any negative spike below a voltage, such as 1–2 volts. In this manner, it is not important to know if instantaneous shorts show up as merely small spikes.

Figure 29:
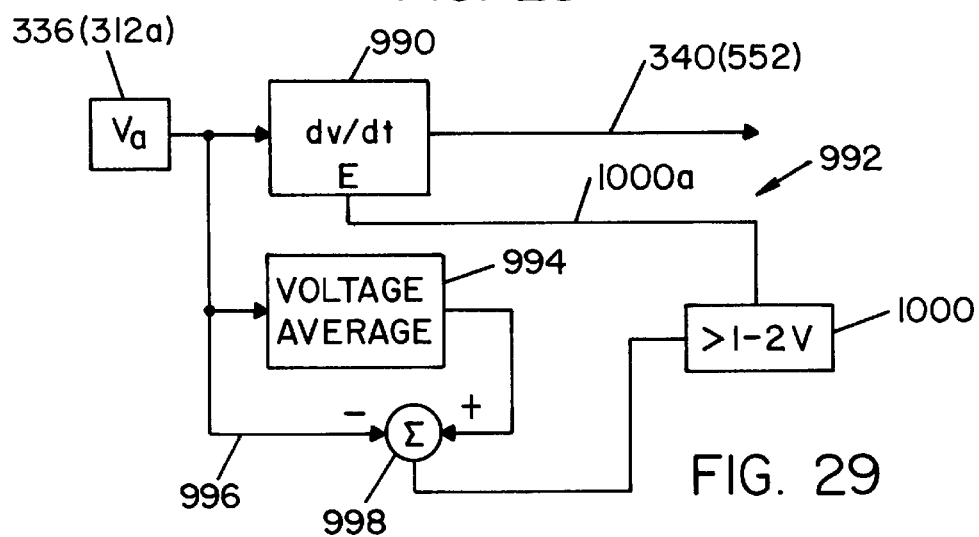
FIG. 29 is a schematic block diagram of the event detector system used in practicing the present invention.

By using a circuit as shown in FIG. 29 the large number of events and the very few shorts or globular transfers that can exist sporadically at such a low rate of events are all detected as spatter events. A dv/dt detector 990 is set to operate at a high frequency, such as 40 kHz. In practice, the dv/dt is detected as having an event E when the sampled voltage minus the previously sampled voltage, divided by the sample time, is greater than a number, such as 10. This detector, in practice, ignores spikes of less than 1–2 volts by the sample time selection. Detector 990 detects all negative spikes in trace 980 of FIG. 28. As an alternative, the exclusion of minor dips not amounting to an event E is accomplished by limit discriminator circuit 992 where the average voltage at block 994 is compared with the raw voltage in line 996 at junction 998. A spike greater than a set amount of 1–2 volts is detected by block 1000 to enable the dv/dt detector 990 by a signal in line 1000*a*. At the low rate used in practicing the invention there are only a few disturbances that are not spatter events in the narrow sense. As a practical matter, at this low rate, these non-events are immaterial to the invention and all negative spikes are detected as a spatter event.

Figure 29A:
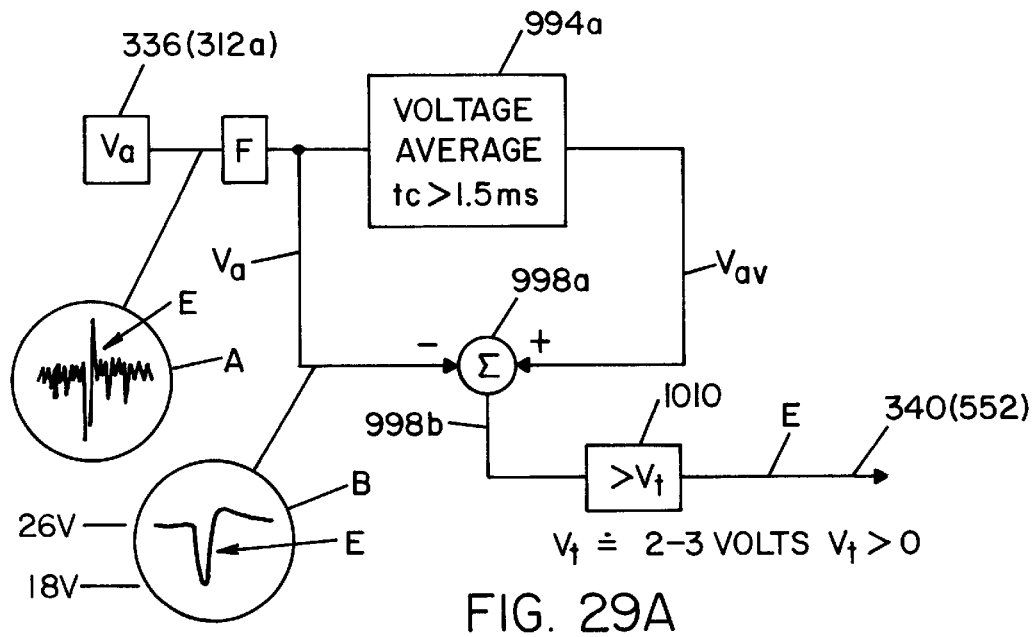
FIG. 29A is a schematic block diagram of a proposed system for detecting spatter events using concepts from the system shown in FIG. 29.
Figure 29B:
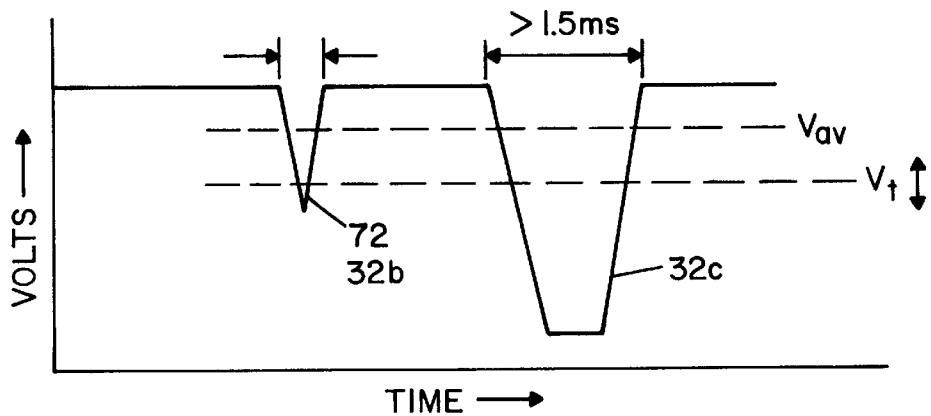
FIG. 29B is a graph showing a trace of event detection by the system shown in FIG. 29A.

A modification of the system shown in FIG. 29 for detecting spatter events is disclosed in FIG. 29A where the arc voltage $V_a$ is averaged by a network 994 having a time constant over 1.5 m seconds to obtain the average arc voltage $V_{av}$ which is compared at junction 998*a* with the raw arc voltage. A threshold circuit 1010 determines if the detected spike in line 998*b* is greater than a threshold voltage $V_t$. If the threshold has been exceeded, a spatter event E is detected. In this system, a spatter event is defined as a negative spike below the threshold that is greater than 1.5 m seconds in duration. This will detect spikes shown in FIG. 30 as spatter events. Consequently, the spatter events based upon time and a threshold voltage detects the occasional short 32*c* as shown in FIG. 29B. By using the event detector shown in FIG. 29A the occasional instantaneous shorts 32*b* are detected as spatter events and globular transfer events. In the embodiments of the invention the raw arc voltage $V_a$ shown in circle A is filtered by a low pulse filter shown as filter F in FIG. 29A. This filter removes high frequency above 10 kHz and is used in the various implementations to reveal the spatter event E as a distinct negative disturbance as shown in circle B. The filtered event E is clean and can be easily detected by a dv/dt detector on either the leading edge or the trailing edge.

Figure 30:
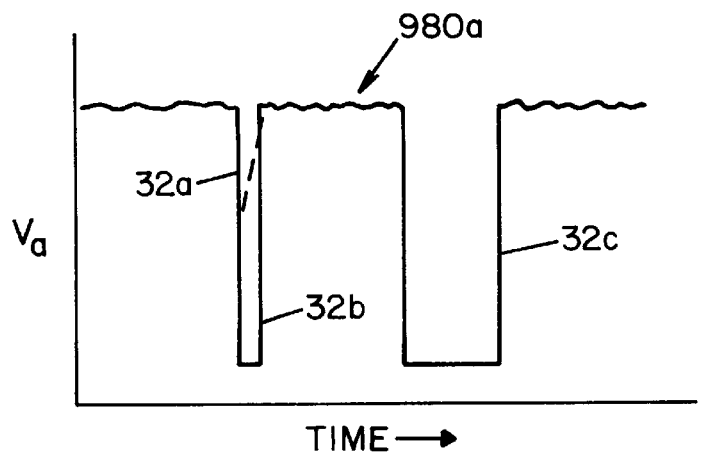
FIG. 30 is a voltage trace as shown in FIG. 28 constructed to explain creation of certain negative spikes; and, FIG. 31 is a schematic block diagram of the device used to digitize the arc voltage for implementation of the invention by a computer or microprocessor.

In FIG. 30, a form of trace 980, i.e. trace 980*a*, is constructed to show that spike 32*a*, which is identified as a globular disturbance, may actually be an incipient or instantaneous short 32*b* that the instrumentation cannot read as a short. This lack of calibration gives the appearance of a mere spike 32*a* for an instantaneous short 32*b*. Indeed, most spatter events may really be instantaneous shorts appearing as small spikes at a low number without affecting the invention. Use of detector 990 disregards such minor distinctions in spatter events.

The present invention has been explained in connection with several block diagrams, as used in practicing the invention. These block diagrams relate to program functions implemented by a microprocessor and performed digitally. It is within the intent of the invention to implement the controls either analog or digitally or by combination of the two. In those instances where the input to the power supply is to be analog and the process is performed digitally, the I/O bus of the microprocessor or digital circuitry includes a digital to analog convertor in accordance with standard control technology. Such converter is used on the output stage of sample and hold network 964.

In practice, the arc voltage which is analyzed as shown in FIGS. 1, 2 and 3 is digitized for processing of the invention in a computer by software already explained. This conversion of the arc voltage is shown in FIG. 31 wherein the raw arc voltage is directed through a voltage divider 1020 having a scale of 0–10 volts at line 1022 connected to an isolation amplifier 1024 with a filter to remove high frequencies above 10 kHz. A standard analog to digital converter 1030 having a sample rate of 1–2 kHz reads the arc voltage as a series of words in line 1032 for processing by microprocessor 1034. The microprocessor performs the functions to give the command signal needed for maintaining the output of the welder at a level providing the desired rate at spatter events. The microprocessor averages the arc voltage as needed in practicing the invention.

Several event detectors have been shown using selected components. They all detect negative spikes over about 1 volt but less than about 6 volts. It is within the broad scope of the invention to count all negative spikes greater than a level such as 1–2 volts, since large spikes do not generally occur when the rate is in the range of 10–30 events per second. It is within the intent of the invention to use the various components in the illustrated combinations to effect the objectives of the invention. Components of various control systems can be used in diverse combinations to practice the invention.

Having thus defined the invention, the following is claimed:

1. A method of controlling in real time a D.C. electric arc welding process wherein a welding wire is advanced toward a workpiece while an arc voltage is applied across said advancing wire and said workpiece, said method comprising:
    (a) detecting spatter events in said arc voltage, where few if any of said events are shorts;
    (b) determining the real time rate of spatter events;
    (c) selecting a desired rate of spatter events; and,
    (d) adjusting said arc voltage to shift said real time rate of spatter events to said desired rate.

2. The method as defined in claim 1 wherein said selected rate of spatter events is in the general range of 10–30 spatter events per second.

3. The method as defined in claim 2 wherein said rate of spatter events is generally 20 spatter events per second.

4. The method as defined in claim 1 wherein said spatter event detection step includes detecting distinct dips in said arc voltage, said dip being at least about 7–10 volts above zero volts.

5. The method as defined in claim 4 wherein said selected rate of spatter events is in the general range of 10–30 spatter events per second.

6. The method as defined in claim 5 wherein said rate of spatter events is generally 20 spatter events per second.

7. The method as defined in claim 1 including the steps of periodically determining said adjusted arc voltage and then holding said arc voltage constant at said determined arc voltage.

8. The method as defined in claim 7 including the step of performing said determining step after the end of a weld cycle.

9. The method as defined in claim 7 including the step of performing said determing step each 10–60 seconds during a weld cycle.

10. The method as defined in claim 1 wherein said detecting step includes converting said arc voltage to a digital representation.

11. The method as defined in claim 1 wherein said detecting step excludes negative dips of less than about 1–2 volts.

12. A controller for controlling the output of a D.C. electric arc welding process wherein a welding wire is advanced toward a workpiece while an arc voltage is applied across said advancing wire and said workpiece, said controller comprising: means for detecting spatter events in said arc voltage, said detecting means includes a circuit that detects small dips in the arc voltage of 1–10 volts; means for determining the real time rate of spatter events; means for selecting a desired rate of spatter events; and, means for adjusting the output of said welder to shift said real time rate of spatter events to said desired rate.

13. A controller as defined in claim 12 wherein said arc voltage is converted to a digital representation before determination of said spatter events.

14. A controller for adjusting an output parameter of a D.C. electric arc welder for controlling a welding process wherein a welding wire is advanced toward a workpiece while an arc voltage is applied across said advancing wire and said workpiece, said controller comprising: means for measuring the rate of spatter events, said events including few if any shorts; and, means for adjusting said output controlling parameter to maintain said measured rate of spatter events at a rate in the range of 10–30 spatter events per second.

15. A controller as defined in claim 14 wherein said output parameter is arc voltage.

16. A method of adjusting an output controlling parameter used to control a D.C. electric arc welding process wherein a welding wire is advanced toward a workpiece while an arc voltage is applied across said advancing wire and said workpiece, said method comprising:
    (a) measuring the rate of spatter events, said events including few if any shorts; and,
    (b) adjusting said output controlling parameter to maintain said measured rate of spatter events at a rate in the range of 10–30 spatter events per second.

17. A method as defined in claim 16 wherein said output parameter is arc voltage.

18. A method of controlling in real time a D.C. electric arc welding process wherein a welding wire is advanced toward a workpiece while an arc voltage is applied across said advancing wire and said workpiece, said method comprising the steps of:
    (a) detecting negative spikes over 2 volts in said arc voltage said spikes having a time width of less than 500 microseconds;
    (b) determining the real time rate of said spikes;
    (c) selecting a desired rate of negative spikes to a value less than 30 spikes per second; and,
    (d) adjusting said arc voltage to shift said real time rate of spikes to said desired rate.

19. The method as defined in claim 18 wherein said rate of spikes is generally 15–20 spatter events per second.

20. The method as defined in claim 18 wherein said negative spike detection step includes detecting negative spikes in said arc voltage in the range of about 1–10 volts.

21. The method as defined in claim 18 wherein said detecting step measures the dv/dt of the negative spikes and detects those spikes where said dv/dt exceeds a given value.

22. A controller for controlling the output of a D.C. electric arc welding process wherein a welding wire is advanced toward a workpiece while an arc voltage is applied across said advancing wire and said workpiece, said controller comprising: means for detecting negative spikes greater than 2 volts, but less than about 10 volts, in said arc voltage; means for determining the real time rate of said negative spikes; means for selecting a desired rate of negative spikes in the range of 10–30 spikes per second; and, means for adjusting said output to shift said real time rate of negative spikes to said desired rate.

23. A controller as defined in claim 22 wherein said selected rate is generally 20 negative spikes events per second.

24. A controller for adjusting an output parameter of a D.C. electric arc welder for controlling a welding process wherein a welding wire is advanced toward a workpiece while an arc voltage is applied across said advancing wire and said workpiece, said controller comprising: means for measuring the rate of negative spikes greater than 2 volts, but less than 10 volts; and, means for adjusting said output controlling parameter to maintain said measured rate at a rate less than 30 negative spikes per second.

25. A controller as defined in claim 24 wherein said output parameter is arc voltage.

26. A controller for controlling a D.C. electric arc welder wherein a welding wire is advanced toward a workpiece while an arc voltage is applied across aid advancing wire and said workpiece, said controller comprising: means for filtering said arc voltage to remove high frequency noise; means for determining the real time rate of spatter events in said filtered voltage; means for selecting a desired rate of spatter events; and, means for adjusting said output of said welder to shift said real time rate to said desired rate.

27. A controller as defined in claim 26 wherein said desired rate is less than 30 spatter events per second.

28. A controller as defined in claim 26 wherein said event detector detects negative spikes greater than 1–2 volts.

29. A controller as defined in claim 26 wherein said selecting means includes a look up table or PROM.

30. A method of controlling a D.C. electric arc welder wherein a welding wire is advanced toward a workpiece while an arc voltage is applied across said advancing wire and said workpiece, said method comprising:

(a) filtering said arc voltage to remove high frequency noise;

(b) determining the real time rate of spatter events in said filtered voltage;

(c) selecting a desired rate of spatter events; and, (d) adjusting said output of said welder to shift said real time rate to said desired rate.

31. A method as defined in claim 30 wherein said desired rate is less than 30 spatter events per second.

32. A method as defined in claim 30 wherein said event detection steps includes detecting negative spikes greater than 1–2 volts.

33. A method as defined in claim 30 wherein said rate selecting step includes sensing a given parameter and changing said selected rate in accordance with the magnitude of said given parameter.

34. A method as defined in claim 33 wherein said changing step uses a look up table or PROM.

* * * * *